(12) United States Patent
Ono et al.

(10) Patent No.: US 12,031,219 B2
(45) Date of Patent: Jul. 9, 2024

(54) CARBON DIOXIDE ELECTROLYTIC DEVICE AND METHOD OF ELECTROLYZING CARBON DIOXIDE

(71) Applicant: KABUSHIKI KAISHA TOSHIBA, Tokyo (JP)

(72) Inventors: Akihiko Ono, Kita (JP); Yuki Kudo, Yokohama (JP); Yusuke Kofuji, Yokohama (JP); Ryota Kitagawa, Setagaya (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 448 days.

(21) Appl. No.: 17/445,872

(22) Filed: Aug. 25, 2021

(65) Prior Publication Data

US 2022/0290311 A1    Sep. 15, 2022

(30) Foreign Application Priority Data

Mar. 15, 2021 (JP) ................. 2021-041453

(51) Int. Cl.
*C25B 1/23* (2021.01)
*C25B 1/04* (2021.01)
(Continued)

(52) U.S. Cl.
CPC .................. *C25B 1/23* (2021.01); *C25B 1/04* (2013.01); *C25B 9/19* (2021.01); *C25B 9/70* (2021.01); *C25B 15/08* (2013.01); *C25B 3/26* (2021.01)

(58) Field of Classification Search
None
See application file for complete search history.

(56) References Cited

U.S. PATENT DOCUMENTS 10,208,385 B2    2/2019    Kudo et al.
10,981,848 B2    4/2021    Ono et al.
(Continued)

FOREIGN PATENT DOCUMENTS

DE    102016211155 A1 *    12/2017
JP    2018-154901 A    10/2018
(Continued)

OTHER PUBLICATIONS

Machine translation of Asanin et al (DE 10 2016 211 155 A1) (Year: 2017).*

(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device of an embodiment includes: an electrolysis cell including a cathode, an anode, a gas supply flow path, a solution supply flow path, and a separator; a $CO_2$ gas supply unit configured to supply $CO_2$ gas to the gas supply flow path; an electrolytic solution supply unit configured to supply an electrolytic solution to the solution supply flow path; and a rinse material supply unit configured to supply a rinse material to the gas supply flow path. The gas supply flow path has a first opening, a second opening, and an auxiliary flow path provided to a part of a flow path between the first opening and the second opening, and configured to make at least the rinse material flow therethrough. A switching mechanism configured to switch a flow direction of the rinse material in the auxiliary flow path is connected to the gas supply flow path.

14 Claims, 11 Drawing Sheets

(51) Int. Cl.
| | |
|---|---|
| C25B 3/26 | (2021.01) |
| C25B 9/19 | (2021.01) |
| C25B 9/70 | (2021.01) |
| C25B 15/08 | (2006.01) |

(56) References Cited

U.S. PATENT DOCUMENTS

| | | |
|---|---|---|
| 2016/0108530 A1* | 4/2016 | Masel ............... B01J 41/14 204/265 |
| 2018/0265440 A1 | 9/2018 | Kudo et al. |
| 2018/0274109 A1 | 9/2018 | Kudo et al. |
| 2019/0085477 A1* | 3/2019 | Ono ..................... C25B 1/00 |
| 2019/0233958 A1* | 8/2019 | Jeanty ................ C25B 11/031 |
| 2020/0002821 A1 | 1/2020 | Ono et al. |
| 2020/0002822 A1 | 1/2020 | Ono et al. |
| 2020/0087233 A1 | 3/2020 | Ono et al. |
| 2020/0223775 A1 | 7/2020 | Kudo et al. |
| 2021/0292926 A1 | 9/2021 | Ono et al. |

FOREIGN PATENT DOCUMENTS

| | | |
|---|---|---|
| JP | 2019-167557 A | 10/2019 |
| JP | 2020-045515 A | 3/2020 |

OTHER PUBLICATIONS

Liu et al., "Electrochemical generation of syngas from water and carbon dioxide at industrially important rates", Journal of $CO_2$ Utilization, 15, 2016, pp. 50-56.

Ma et al., "Efficient Electrochemical Flow System with Improved Anode for the Conversion of $CO_2$ to CO", Journal of the Electrochemical Society, 161 (10), 2014, pp. F1124-F1131.

* cited by examiner

CARBON DIOXIDE ELECTROLYTIC DEVICE AND METHOD OF ELECTROLYZING CARBON DIOXIDE

CROSS REFERENCE TO RELATED APPLICATION

This application is based upon and claims the benefit of priority from Japanese Patent Application No. 2021-041453, filed on Mar. 15, 2021; the entire contents of which are incorporated herein by reference.

FIELD

Embodiments disclosed herein relate to a carbon dioxide electrolytic device and a method of electrolyzing carbon dioxide.

BACKGROUND

In recent years, depletion of fossil fuel such as petroleum or coal has been concerned, and expectation for sustainably renewable energy has been rising. As the renewable energy, a solar cell, wind power generation, and the like can be cited. Because a power generation amount of these depends on weather and a natural situation, there is a problem that it is difficult to realize stable supply of electric power. For this reason, there has been made an attempt to store the electric power generated by the renewable energy in a storage battery, to thereby stabilize the electric power. However, when the electric power is stored, there are problems that a cost is required for the storage battery, and a loss occurs at a time of the storage.

With respect to such points, attention is focused on a technology in which the electric power generated by the renewable energy is used to electrochemically reduce and convert, for example, carbon dioxide ($CO_2$) into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). As a $CO_2$ electrolytic device, for example, a structure is being studied in which $CO_2$ gas is brought into contact with a cathode having a gas diffusion layer, a catalyst layer, and so on, and an anode solution is brought into contact with an anode. As a concrete configuration of an electrolysis cell of the electrolytic device, there can be cited a configuration which includes, for example, a cathode, a $CO_2$ gas flow path disposed along the cathode, an anode, an anode solution flow path disposed along the anode, and a separator disposed between the $CO_2$ gas flow path and the anode solution flow path.

When the reaction of producing, for example, CO from $CO_2$ is performed for a long period of time by using the electrolytic device having the configuration as described above, deterioration of cell outputs such as a reduction in production amount of CO and an increase in cell voltage occurs over time. As a reason thereof, there can be considered precipitation of salt in the $CO_2$ gas flow path. Accordingly, it is proposed that a rinse solution such as water is introduced into the $CO_2$ gas flow path in accordance with passage of the electrolysis time to dissolve the salt in the flow path, thereby performing refresh. However, the introduction of the rinse solution into the $CO_2$ gas flow path may cause infiltration (flooding) of the rinse solution to the gas diffusion layer, the catalyst layer, or the like constituting the cathode. The flooding causes a disturbance of the supply of $CO_2$ to the catalyst, a decrease in the reaction efficiency, and so on. When a pressure loss of the $CO_2$ gas flow path occurs, it becomes difficult to supply a fixed amount of rinse solution to the $CO_2$ gas flow path of the electrolysis cell. For example, when plural electrolysis cells are stacked to configure an electrolytic device, it is difficult to supply a fixed amount of rinse solution to each of $CO_2$ gas flow paths of the respective cells.

DETAILED DESCRIPTION

Figure 1:
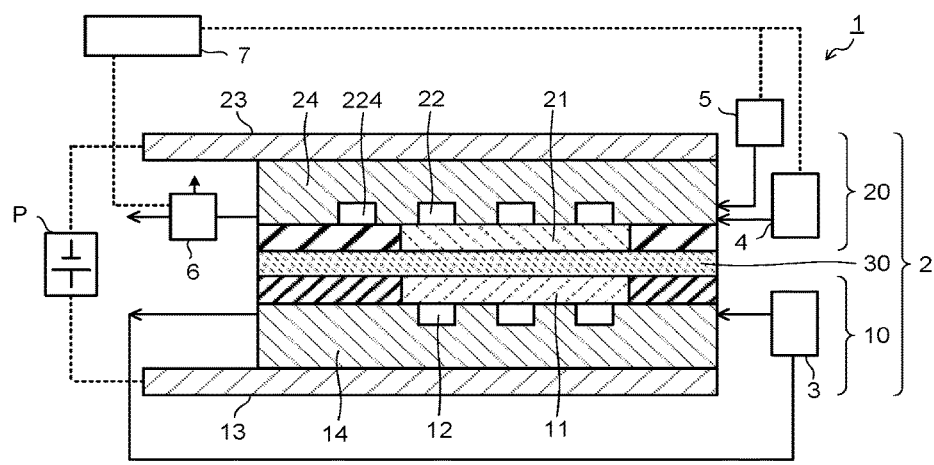
FIG. 1 is a sectional view illustrating a schematic configuration of a carbon dioxide electrolytic device of an arrangement.

A carbon dioxide electrolytic device of an embodiment includes: a first electrolysis cell including a cathode to reduce carbon dioxide to produce a carbon compound, an anode to oxidize water to produce oxygen, a gas supply flow path to supply carbon dioxide to the cathode, a solution supply flow path to supply an electrolytic solution containing water to the anode, and a separator to separate the anode from the cathode; a carbon dioxide supply unit to supply the carbon dioxide to the gas supply flow path; an electrolytic solution supply unit to supply the electrolytic solution to the solution supply flow path; and a rinse material supply unit to supply a rinse material to the gas supply flow path. In the carbon dioxide electrolytic device of the embodiment, the gas supply flow path has a first opening provided on one end side, a second opening provided on the other end side, and an auxiliary flow path provided to a part of a flow path between the first opening and the second opening, and configured to make at least the rinse material flow therethrough; and a switching mechanism configured to switch a flow direction of the rinse material in the auxiliary flow path is connected to the gas supply flow path.

Hereinafter, a carbon dioxide electrolytic device of an embodiment will be described while referring to the drawings. In each embodiment presented below, substantially the same components are denoted by the same codes, and a description thereof is sometimes partially omitted. The drawings are schematic, and a relationship between a thickness and a planar size, thickness proportions of the respective portions, and the like are sometimes different from actual ones.

FIG. 1 is a view illustrating a carbon dioxide electrolytic device according to an embodiment. A carbon dioxide electrolytic device 1 illustrated in FIG. 1 includes an electrolysis cell 2, an electrolytic solution supply unit 3 which supplies an electrolytic solution as an anode solution to the electrolysis cell 2, a gas supply unit 4 which supplies carbon dioxide ($CO_2$) gas to the electrolysis cell 2, a rinse material supply unit 5 which supplies a rinse material to the electrolysis cell 2, a product collection unit 6 which collects a product produced by a reduction reaction in the electrolysis cell 2, and a control unit 7 which performs control of the product and control of the respective units 2, 3, 4, 5, 6.

The electrolysis cell 2 includes an anode part 10, a cathode part 20, and a separator 30. The anode part 10 includes an anode 11, an anode solution flow path 12, and an anode current collector 13. The cathode part 20 includes a cathode 21, a $CO_2$ gas flow path 22, and a cathode current collector 23. The separator 30 is disposed to separate the anode part 10 from the cathode part 20. The electrolysis cell 2 is sandwiched between a pair of not-illustrated support plates, and further tightened by bolts or the like. The anode part 10 and the cathode part 20 of the electrolysis cell 2 are connected to a power supply P, and a voltage is applied to the anode part 10 and the cathode part 20 from the power supply P. The power supply P is not limited to a normal system power supply, battery, or the like, but may be a power source which supplies electric power generated by renewable energy such as a solar cell, wind power generation, or geothermal power generation.

The anode 11 is an electrode (oxidation electrode) which causes an oxidation reaction of water ($H_2O$) in the anode solution as an electrolytic solution to produce oxygen ($O_2$). The anode 11 has a first surface in contact with the separator 30, and a second surface facing the anode solution flow path 12. The first surface of the anode 11 is in close contact with the separator 30. The anode solution flow path 12 supplies the anode solution to the anode 11, and is formed of a pit (groove portion/recessed portion) provided in a first flow path plate 14. The anode solution flows through the inside of the anode solution flow path 12 so as to be in contact with the anode 11. The anode current collector 13 is in electrical contact with a surface on a side opposite to the anode 11 of the first flow path plate 14 which forms the anode solution flow path 12.

The first flow path plate 14 is provided with an electrolytic solution introduction port and an electrolytic solution discharge port, whose illustration is omitted, and the anode solution is introduced and discharged through the ports. The anode solution is circulated via the electrolytic solution introduction port and the electrolytic solution discharge port. It is preferable to use, for the first flow path plate 14, a material having low chemical reactivity and high conductivity. As such materials, there can be cited metal materials such as Ti and SUS, carbon materials, and the like. It is preferable that plural lands (projections) are provided in the anode solution flow path 12. The lands are provided for mechanical retention and electrical continuity. The lands are preferably provided in an alternate manner for uniformizing the flow of the anode solution. Because of the lands as above, the anode solution flow path 12 meanders. In addition, also for successfully discharging the anode solution containing oxygen ($O_2$) gas mixed therein, it is preferable to provide the lands in an alternate manner in the anode solution flow path 12 to make the anode solution flow path 12 meander.

It is preferable that the anode 11 is mainly constituted of a catalyst material (anode catalyst material) capable of oxidizing water ($H_2O$) to produce oxygen or hydrogen ions and capable of reducing an overvoltage in such a reaction. Examples of the anode catalyst material include metals such as platinum (Pt), palladium (Pd), and nickel (Ni), alloys and intermetallic compounds containing the above metals, binary metal oxides such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), and a lanthanum oxide (La—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as a Ru complex and a Fe complex.

The anode 11 includes a base material having a structure capable of making the anode solution and ions move between the separator 30 and the anode solution flow path 12, for example, a porous structure such as a mesh material, a punching material, a porous body, or a metal fiber sintered body. The base material may be constituted of a metal such as titanium (Ti), nickel (Ni), or iron (Fe), or a metal material such as an alloy (for example, SUS) containing at least one of these metals, or may be constituted of the above-described anode catalyst material. When an oxide is used as the anode catalyst material, it is preferable to form a catalyst layer by attaching or stacking the anode catalyst material on a surface of the base material made of the above-described metal material. The anode catalyst material may have nanoparticles, a nanostructure, a nanowire, or the like for the purpose of increasing the oxidation reaction. The nanostructure is a structure in which nanoscale irregularities are formed on a surface of the catalyst material.

The cathode 21 is an electrode (reduction electrode) which causes a reduction reaction of carbon dioxide ($CO_2$) to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). In the cathode 21, a side reaction in which hydrogen ($H_2$) is produced by a reduction reaction of water ($H_2O$) is caused simultaneously with the reduction reaction of carbon dioxide ($CO_2$) in some cases. The cathode 21 has a first surface in contact with the separator 30, and a second surface facing the $CO_2$ gas flow path 22.

The $CO_2$ gas flow path 22 is formed of a pit (groove portion/recessed portion) provided in a second flow path plate 24. It is preferable to use, for the second flow path plate 24 forming the $CO_2$ gas flow path 22, a material having low chemical reactivity and high conductivity. As such materials, there can be cited metal materials such as Ti and SUS, carbon materials, and the like. The second flow path plate 24 is provided with gas introduction port and discharge port, whose illustration is omitted, and gas containing $CO_2$ (hereinafter, also described as $CO_2$ gas) is introduced and discharged by the gas supply unit 4 via these gas introduction port and gas discharge port. The $CO_2$ gas flow path 22 will be described later in detail. The cathode current collector 23 is in electrical contact with a surface on a side opposite to the cathode 21 of the second flow path plate 24. Note that the first flow path plate 14 and the second flow path plate 24 are provided with screw holes and the like for tightening. Further, at the front and the rear of each of the flow path plates 14, 24, packing or the like, whose illustration is omitted, is sandwiched as needed.

The cathode 21 has a gas diffusion layer and a cathode catalyst layer, for example. Between the gas diffusion layer and the cathode catalyst layer, a porous layer denser than the gas diffusion layer may be disposed. The gas diffusion layer is disposed on the $CO_2$ gas flow path 22 side, and the cathode catalyst layer is disposed on the separator side. The cathode catalyst layer may enter the gas diffusion layer. The cathode catalyst layer preferably has catalyst nanoparticles, a catalyst nanostructure, or the like. The gas diffusion layer is constituted of, for example, carbon paper, carbon cloth, or the like, and has been subjected to water repellent treatment. The cathode catalyst layer is supplied with an electrolytic solution and ions from the anode 11 via the separator 30. In the gas diffusion layer, the $CO_2$ gas is supplied from the $CO_2$ gas flow path 22, and a product obtained by the reduction reaction of the $CO_2$ gas is discharged. The reduction reaction of $CO_2$ occurs in the vicinity of the boundary between the gas diffusion layer and the cathode catalyst layer, and a gaseous product is discharged from the $CO_2$ gas flow path 22 to the product collection unit 6.

The cathode catalyst layer is preferably constituted of a catalyst material (cathode catalyst material) capable of reducing $CO_2$ to produce a carbon compound and capable of reducing an overvoltage in the above reaction. Examples of the cathode catalyst material include metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), metal materials such as alloys and intermetallic compounds containing at least one of the above metals, carbon materials such as carbon (C), graphene, CNT (carbon nanotube), fullerene, and ketjen black, and metal complexes such as a Ru complex and a Re complex. The cathode catalyst layer can employ various shapes such as a plate shape, a mesh shape, a wire shape, a particle shape, a porous shape, a thin film shape, and an island shape.

The separator 30 is constituted of an ion exchange membrane or the like capable of making the ions and the electrolytic solution move between the anode 11 and the cathode 21, and capable of separating the anode part 10 from cathode part 20. Examples of the ion exchange membrane include Neosepta (registered trademark) manufactured by ASTOM Corporation, Selemion (registered trademark) and Aciplex (registered trademark) manufactured by ASAHI GLASS CO., LTD., Fumasep (registered trademark) and fumapem (registered trademark) manufactured by Fumatech, Nafion (registered trademark) being a fluorine resin made by sulfonating and polymerizing tetrafluoroethylene manufactured by Du Pont, lewabrane (registered trademark) manufactured by LANXESS, IONSEP (registered trademark) manufactured by IONTECH, Mustang (registered trademark) manufactured by PALL, ralex (registered trademark) manufactured by Mega, Gore-Tex (registered trademark) manufactured by GORE-TEX and so on. However, other than the ion exchange membrane, a glass filter, a porous polymeric membrane, a porous insulating material, or the like may be applied to the separator 30, as long as they are materials capable of making ions move between the anode 11 and the cathode 21.

For the anode solution as the electrolytic solution, a solution containing at least water ($H_2O$) is used. As the solution containing $H_2O$ used as the anode solution, there can be cited an aqueous solution containing an arbitrary electrolyte. Examples of the aqueous solution containing the electrolyte include an aqueous solution containing at least one selected from a hydroxide ion ($OH^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), a carbonate ion ($CO_3^{2-}$), and a hydrogen carbonate ion ($HCO_3^-$). In order to reduce an electrical resistance of the electrolytic solution, an alkaline solution in which an electrolyte such as a potassium hydroxide or a sodium hydroxide is dissolved in high concentration may be used as the anode solution.

The electrolytic solution supply unit 3 which supplies the anode solution to the anode part 10 is configured to make the anode solution flow through the inside of the anode solution flow path 12. An electrolytic solution supply system including the electrolytic solution supply unit 3 has a pressure controller, an electrolytic solution tank, a flow rate controller (pump), a reference electrode, a pressure gauge, and so on, which are not illustrated, and is configured to make the anode solution circulate through the anode solution flow path 12. The anode solution tank is connected to a gas component collection unit which collects a gas component such as oxygen ($O_2$) contained in the circulating anode solution. The anode solution is introduced into the anode solution flow path 12 after its flow rate and pressure are controlled in the pressure controller and the flow rate controller.

The gas supply unit 4 which supplies the $CO_2$ gas to the cathode part 20 is configured to make the $CO_2$ gas flow through the inside of the $CO_2$ gas flow path 22. A gas supply system including the gas supply unit 4 has a $CO_2$ gas cylinder, a flow rate controller, and a pressure controller, which are not illustrated. The $CO_2$ gas is introduced into the $CO_2$ gas flow path 22 after its flow rate and pressure are controlled. The gas supply system is connected to the product collection unit 6 which collects a product in the gas flowed through the $CO_2$ gas flow path 22. The product collection unit 6 has a gas/liquid separator and a product storage part, which are not illustrated. A reduction product such as CO or $H_2$ contained in the gas flowed through the $CO_2$ gas flow path 22 is stored in the product storage part via the gas/liquid separator. The reduction product stored in the product storage part is subjected to analysis regarding its type, ratio, and the like according to need, and results of the analysis are transmitted to the control unit 7.

As will be described later, the rinse material supply unit 5 has a solution tank which stores the rinse solution such as water, the cooling water, the discharge solution from the cathode part 20, and the electrolytic solution as the anode solution, as the rinse material, and it supplies the rinse material from such a solution tank to the $CO_2$ gas flow path 22. The rinse material may also be water vapor or the like. A supply configuration and a supply step of the rinse material during a normal operation step (electrolysis step) and during a rinse step will be described later in detail. The rinse material supply unit 5 may also include a gaseous substance supply system for drying, separately from the liquid rinse material supply system. The rinse material supply system including the rinse material supply unit 5 has a rinse material tank which is a supply source of a rinse material, a flow rate controller (pump) which controls a supply flow rate or the like of the rinse material, and so on, which are not illustrated. The gaseous substance supply system has a gas tank which is a supply source of a gaseous substance such as air, carbon dioxide, oxygen, nitrogen, or argon, a pressure controller which controls a supply pressure of the gaseous substance, and so on.

A part of the reduction product stored in the product collection unit 6 is sent to a not-illustrated reduction performance detector. In the reduction performance detector, a production amount and a proportion of each product such as CO or $H_2$ in the reduction product, are detected. The detected production amount and proportion of each product are input into the control unit 7. The control unit 7 further collects electrical data such as a cell voltage, a cell current, a cathode potential, and an anode potential, as part of cell outputs of the electrolysis cell 2. The control unit 7 is electrically connected, via bi-directional signal lines whose illustration is partially omitted, to the electrolytic solution supply unit 3, the gas supply unit 4, the rinse material supply unit 5, and so on, in addition to the reduction performance detector, and it collectively controls them. Each pipe is provided with a not-illustrated valve, and an opening/closing operation of the valve is also controlled by the control unit 7.

Figure 2:
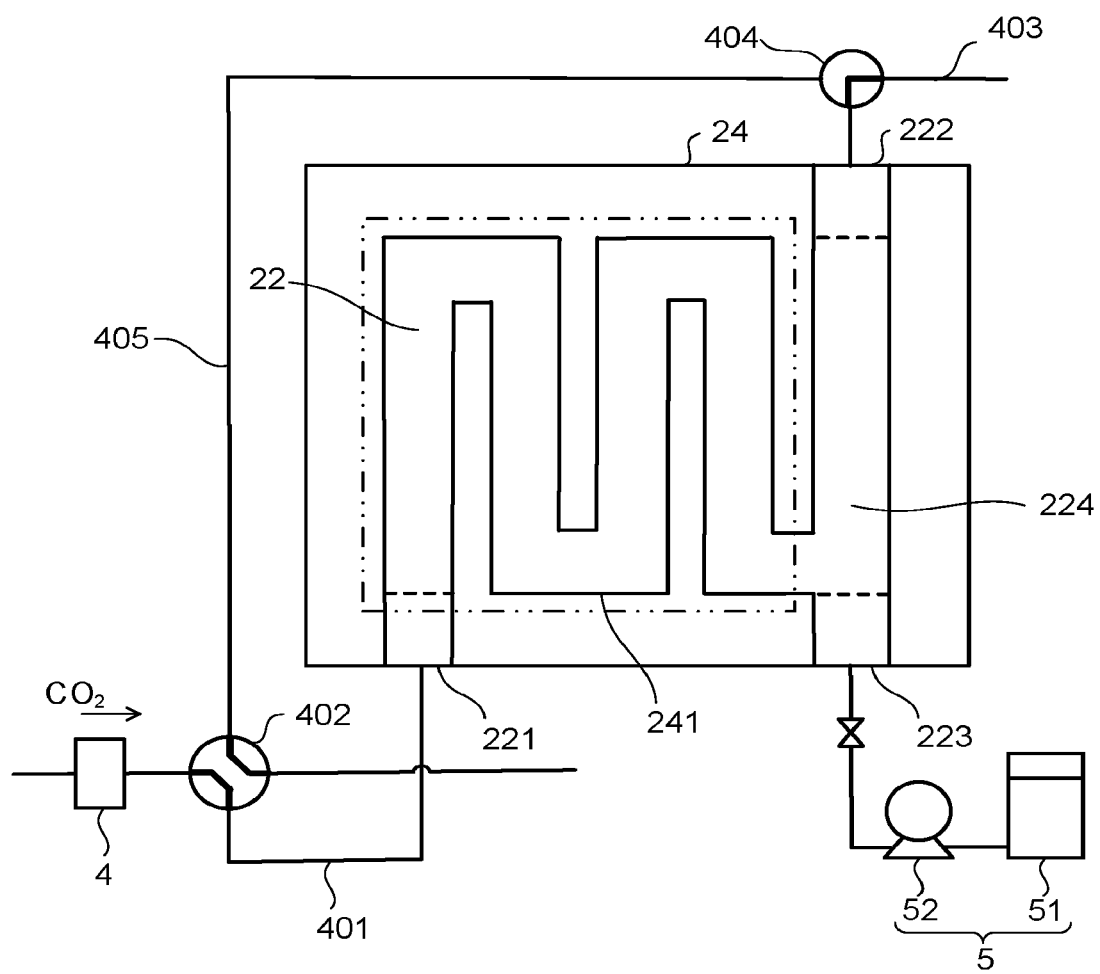
FIG. 2 is a plan view illustrating a first example of a $CO_2$ gas flow path of a cathode part in an electrolysis cell of the arrangement illustrated in FIG. 1.

The second flow path plate 24 of the electrolysis cell 2 is provided with the $CO_2$ gas flow path 22, as illustrated in FIG. 2. The $CO_2$ gas flow path 22 is constituted of a groove 241 provided in the second flow path plate 24, and meanders according to the shape of the groove 241. The $CO_2$ gas flow path 22 includes a first opening 221 being an inlet for the $CO_2$ gas, for example, and a second opening 222 being an outlet for the product gas such as CO, unreacted $CO_2$ gas, the discharge solution in the cathode 21, and the like, for example. The first opening 221 is provided at one end portion of the $CO_2$ gas flow path 22, and the second opening 222 is provided at the other end portion of the $CO_2$ gas flow path 22. The $CO_2$ gas flow path 22 further includes a third opening 223 provided at a position between the first opening 221 and the second opening 222. A flow path between the second opening 222 and the third opening 223 forms an auxiliary flow path 224 for making the rinse material constantly flow, for example, during the electrolysis operation. The auxiliary flow path 224 is not limited to a flow path which is normally in an opening state, but it may also be a flow path made of a conductive porous body or the like. This makes it possible to obtain an effect of humidifying the electrolysis cell 2.

To the first opening 221, the gas supply unit 4 is connected via a first pipe 401 and a multiport valve 402. To the second opening 222, a second pipe 403 which discharges the product gas such as CO, the unreacted $CO_2$ gas, the discharge solution in the cathode 21, and the like, is connected via a multiport valve 404. In addition, to the second opening 222, the gas supply unit 4 is connected via a third pipe 405 and the multiport valve 404. To the third opening 223, a rinse material tank 51 that forms the rinse material supply unit 5 is connected via a flow rate controller (pump) 52 which controls a supply flow rate or the like of the rinse material. The rinse material storage tank 51 is not limited to a tank that simply stores water as the rinse solution, but it may also be a tank which stores the discharge solution from the cathode part 20, the electrolytic solution as the anode solution, the cooling water, and the like, as will be described later. An operation of supplying the $CO_2$ gas and the rinse material to the $CO_2$ gas flow path 22 will be described later in detail.

Figure 3:
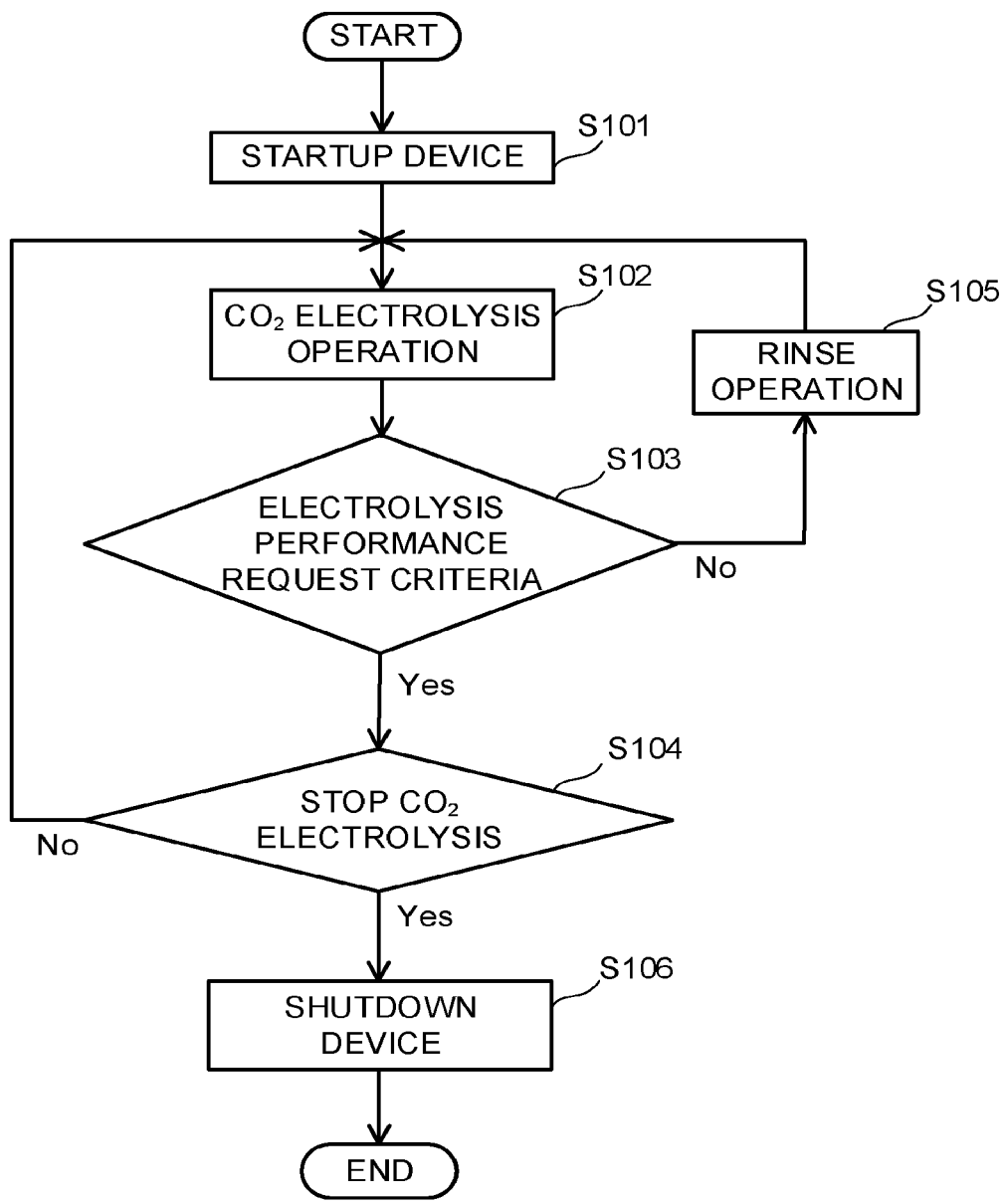
FIG. 3 is a chart illustrating an operation process of the carbon dioxide electrolytic device of the arrangement.

A working operation of the carbon dioxide electrolytic device 1 of the embodiment will be described. First, as illustrated in FIG. 3, a start-up step S101 of the electrolytic device 1 is performed. In the start-up step S101 of the electrolytic device 1, the following operation is performed. The electrolytic solution supply unit 3 controls a flow rate and a pressure of the anode solution and then supplies the solution to the anode solution flow path 12. The gas supply unit 4 controls a flow rate and a pressure of the $CO_2$ gas and then supplies the gas to the $CO_2$ gas flow path 22 from the first opening 221. The $CO_2$ gas supplied from the first opening 221 flows to the second opening 222. The rinse material supply unit 5 supplies the rinse material from the third opening 223. The rinse material supplied from the third opening 223 flows to the second opening 222. The rinse material that flows from the third opening 223 to the second opening 222, does not directly contribute to the rinse operation during the reduction operation but is prepared as a rinse material required for the rinse operation to be performed later. The rinse material is discharged from the second opening 222 together with the product gas such as CO, the discharge solution from the cathode 21, and the like.

Next, a $CO_2$ electrolysis operation step S102 is performed. In the $CO_2$ electrolysis operation step S102, output from the power supply P is started to the electrolytic device 1 which has been subjected to the start-up step S101, and a current is supplied by applying the voltage between the anode 11 and the cathode 21. When the current is made to flow between the anode 11 and the cathode 21, an oxidation reaction in the vicinity of the anode 11 and a reduction reaction in the vicinity of the cathode 21 occur, which will be described below. Here, a case of producing carbon monoxide (CO) as the carbon compound is mainly described, but the carbon compound as the reduction product of carbon dioxide is not limited to carbon monoxide and may be the above-described organic carbon compounds such as $CH_4$, $C_2H_6$, $C_2H_4$, $CH_3OH$, $C_2H_5OH$, and $C_2H_6O_2$.

First, when a current is supplied between the anode 11 and the cathode 21 from the power supply P, an oxidation reaction of water ($H_2O$) occurs in the anode 11 which is in contact with the anode solution. As presented in following Formula (1), $H_2O$ contained in the anode solution is oxidized to produce oxygen ($O_2$) and hydrogen ions ($H^+$).

$$2H_2O \rightarrow 4H^+ + O_2 + 4e^- \quad (1)$$

$H^+$ produced in the anode 11 moves in the anode solution existing in the anode 11, and the separator 30, and reaches the vicinity of the cathode 21. The reduction reaction of carbon dioxide ($CO_2$) occurs by electrons ($e^-$) based on the current supplied from the power supply P to the cathode 21 and $H^+$ moved to the vicinity of the cathode 21. As presented in following Formula (2), $CO_2$ supplied from the $CO_2$ gas flow path 22 to the cathode 21 is reduced to produce CO.

$$2CO_2 + 4H^+ + 4e^- \rightarrow 2CO + 2H_2O \quad (2)$$

Figure 4:
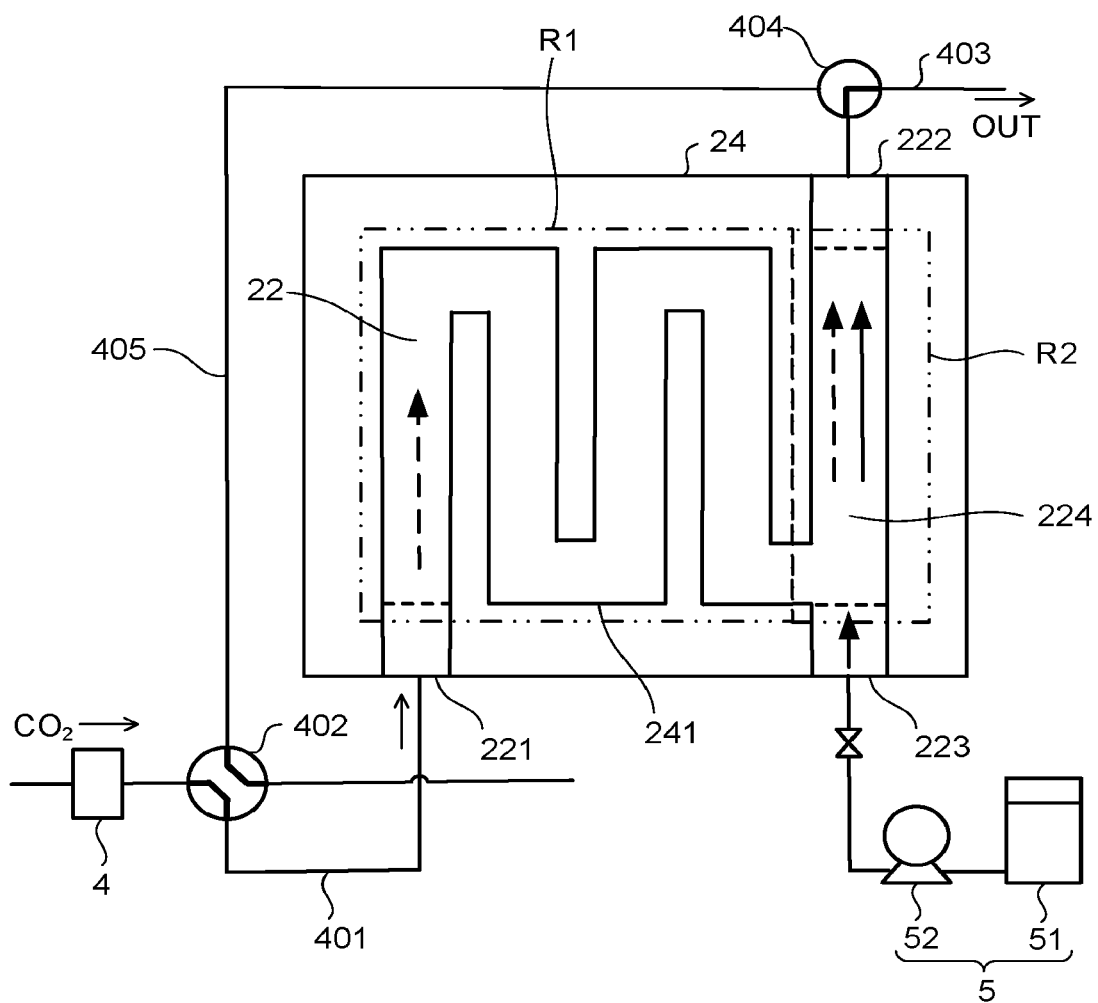
FIG. 4 is a plan view illustrating a configuration of the $CO_2$ gas flow path during an electrolysis operation of the cathode part illustrated in FIG. 2.

In the electrolysis operation, as illustrated in FIG. 4, the multiport valve (2-position 4-port valve, in this case) 402 is connected to the first pipe 401, to make the $CO_2$ gas flow through the $CO_2$ gas flow path 22 via the first opening 221. The second opening 222 is connected to the second pipe 403 by the multiport valve (2-position 3-port valve, in this case) 404. The $CO_2$ gas is reduced during a period of time in which it flows from the first opening 221 to the second opening 222, and the product gas such as CO, the discharge solution from the cathode 21, and the like are discharged from the second opening 222. The rinse material is supplied from the third opening 223 also in the electrolysis operation, and it flows to the second opening 222 because of a flow of gas flowing through the $CO_2$ gas flow path 22. In the electrolysis operation, the rinse material is discharged from the second opening 222 together with the product gas, the cathode discharge solution, and the like. The step of making the rinse material flow from the third opening 223 to the second opening 222 is performed simultaneously with the $CO_2$ gas supply step in the electrolysis operation, and is a step for preparing the rinse material required for the rinse operation to be performed later.

In the above-described reaction process in the cathode 21, the reduction reaction of $CO_2$ is considered to occur in the vicinity of the boundary between the gas diffusion layer and the cathode catalyst layer, as described above. At this time, the electrolytic solution (anode solution) which reaches the cathode 21 via the separator 30 enters up to the gas diffusion layer or the cathode catalyst layer has excess water, thus causing such a trouble that the production amount of CO produced by the reduction reaction of $CO_2$ reduces or the cell voltage increases. The reduction in the cell outputs of the electrolysis cell 2 as above is also caused by deviation of distribution of ions and residual gas in the vicinity of the anode 11 and the cathode 21, precipitation of an electrolyte in the cathode 21 and the anode 11, precipitation of an electrolyte in the anode solution flow path 12 and the $CO_2$ gas flow path 22, and the like. In order to detect the reduction in $CO_2$ electrolysis performance such as the cell outputs as above, a step S103 which determines whether or not the electrolysis performance satisfies the request criteria, is performed.

The control unit 7 collects, for example, periodically or continuously the production amount and the proportion of each product and the cell outputs such as the cell voltage, the cell current, the cathode potential, and the anode potential, as described above. Further, in the control unit 7, the request criteria of the electrolysis performance are previously set, and it is determined whether or not the collected data satisfies the set request criteria. When the collected data satisfies the set request criteria, the $CO_2$ electrolysis operation S102 is continued without performing a $CO_2$ electrolysis stop (S104). When the collected data does not satisfy the set request criteria, a rinse operation step S105 is performed.

Examples of the request criteria of the cell outputs collected by the control unit 7 include an upper limit value of a cell voltage when a constant current is made to flow through the electrolysis cell 2, a lower limit value of a cell current when a constant voltage is applied to the electrolysis cell 2, Faradaic efficiency of the carbon compound produced by the reduction reaction of $CO_2$, and the like. Here, the Faradaic efficiency is defined as a proportion of a current contributing to the production of an intended carbon compound with respect to a total current flowed through the electrolysis cell 2. In order to maintain the electrolysis efficiency, the rinse operation step S105 is preferably performed when the upper limit value of the cell voltage at a time of making the constant current flow reaches 150% or more, preferably 120% or more of a set value. Further, the lower limit value of the cell current at a time of applying the constant voltage is 50% or less, preferably 80% or less of a set value, and the rinse operation step S105 is preferably performed when the lower limit value reaches such a value. In order to maintain the production amount of the reduction product such as the carbon compound, the rinse operation step S105 is preferably performed when the Faradaic efficiency of the carbon compound becomes 50% or less, preferably 80% or less of a set value.

Regarding the determination of the cell outputs, for example, when any one of the cell voltage, the cell current, and the Faradaic efficiency of the carbon compound does not satisfy the request criterion, it is determined that the cell outputs do not satisfy the request criteria, and the rinse operation step S105 is performed. Further, it is also possible to set the request criteria of the cell outputs by combining two or more of the cell voltage, the cell current, and the Faradaic efficiency of the carbon compound. The rinse operation step S105 may be performed, for example, when neither the cell voltage nor the Faradaic efficiency of the carbon compound satisfies the request criterion. The rinse operation step S105 is performed when at least one of the cell outputs does not satisfy the request criterion. In order to stably perform the $CO_2$ electrolysis operation step S102, the rinse operation step S105 is preferably performed at an interval of, for example, one hour or more.

Further, the operation of the electrolysis cell 2 causes precipitation of salt in the $CO_2$ gas flow path 22 and the like, thereby blocking the $CO_2$ gas flow path 22 or reducing the gas diffusibility, resulting in a reduction in output. This is because ions pass between the anode 11 and the cathode 21 via the separator 30, and the ions react with the gas component supplied to the electrolysis cell 2 and cause the precipitation of salt. For example, when a potassium hydroxide solution is used for the anode 11 and $CO_2$ is made to flow through the cathode 21, potassium ions move from the anode 11 to the cathode 21, and the ions react with $CO_2$ to produce a potassium hydrogen carbonate or a potassium carbonate. When they reach conditions equal to or less than the solubility, salt precipitates in the $CO_2$ gas flow path 22 and the like.

When the $CO_2$ gas flow path 22 is blocked, a uniform gas flow in the entire electrolysis cell 2 is hindered, also causing a reduction in output. In some cases, when the gas flow rate partially increases, the performance of the electrolysis cell 2 itself may improve. This is because an increase in gas pressure increases the gas component or the like supplied to the catalyst or increases the gas diffusibility to improve the cell performance in some cases. If the request criteria of the cell outputs are judged based on only one of the cell voltage, the cell current, and the Faradaic efficiency of the carbon compound, such a phenomenon may occur that salt precipitates in the $CO_2$ gas flow path 22 and the gas diffusion layer to rapidly reduce the output even in a case where the cell performance improves or does not change. It is preferable, in the rinse operation, to sense the reduction in output in advance and perform the rinse operation at an appropriate time, and it is also preferable, as the operating method, to sense the precipitation of salt by the change in pressure of the $CO_2$ gas flow path 22 and perform the rinse operation in advance.

The judgment regarding the necessity of the rinse operation is preferably made based not only on the cell voltage, the current value, and the sensing of salt by the voltage change in the cell, but also on the gas/liquid separation performance between the anode 11 and the cathode 21 when the anode 11 and the cathode 21 are separated by the separator 30 of a porous body, namely, a movement amount of the liquid and gas between the anode 11 and the cathode 21, a gas amount of the product, a voltage difference relative to a reference electrode, an estimated value of the Faradaic efficiency from these parameters, and the like. The calculation of the Faradaic efficiency from the respective parameter values and the necessity of the rinse operation can be comprehensively determined as the judgment of the necessity of the rinse operation also from later-described parameters, and any combination of respective values and any calculation method are applicable.

The necessity of the rinse operation may be judged based on a flooding degree estimated from pieces of cell data, a voltage change, and the like obtained by an operating method for detecting a flooding performance. Further, an operating time of the electrolysis cell 2 is taken into consideration in some cases. The operating time is not limited to an operating time after the operation is started, but may be an integrated value of the operating time so far, a duration, or an operating time after the rinse operation as described above. Further, it is also possible to use a calculated value of multiplication of the integrated voltage value by time, multiplication of the current value by time, or the like, and any combination and calculation method thereof can be applied. The calculated values of these combinations are preferable as compared to the judgment simply based on the duration or the like, since a difference depending on the operating method of the electrolysis cell 2 is also taken into consideration. Furthermore, it is also possible to use a variation value of the current or the voltage, a pH value and a change value of the electrolytic solution, and oxygen generation amount and variation amount.

It is preferable to perform the working operation of judging the necessity of the rinse operation and make a judgment based on the parameter value such as a cell voltage at a time of the operation, since the necessity of the rinse operation can be accurately judged although the working operation time is reduced. Note that a judgment operating time of the rinse operation at this time is preferably at least half or less of an operation time of the rinse operation, desirably ¼ or less, and ideally ¹⁄₁₀ or less. Regarding respective parameters for judging the necessity of the rinse operation, pieces of cell data are collected from many pieces of cell data via an electronic network, required parameters are derived by data collectors and data analyzers of plural electrolysis cells 2, through big data analysis, machine learning or the like, and the controller for the refresh operation is made to update the respective parameters for judging the necessity of the rinse operation, thereby making it possible to constantly perform the best rinse operation. The necessity of the rinse operation can be judged by various methods.

Figure 5:
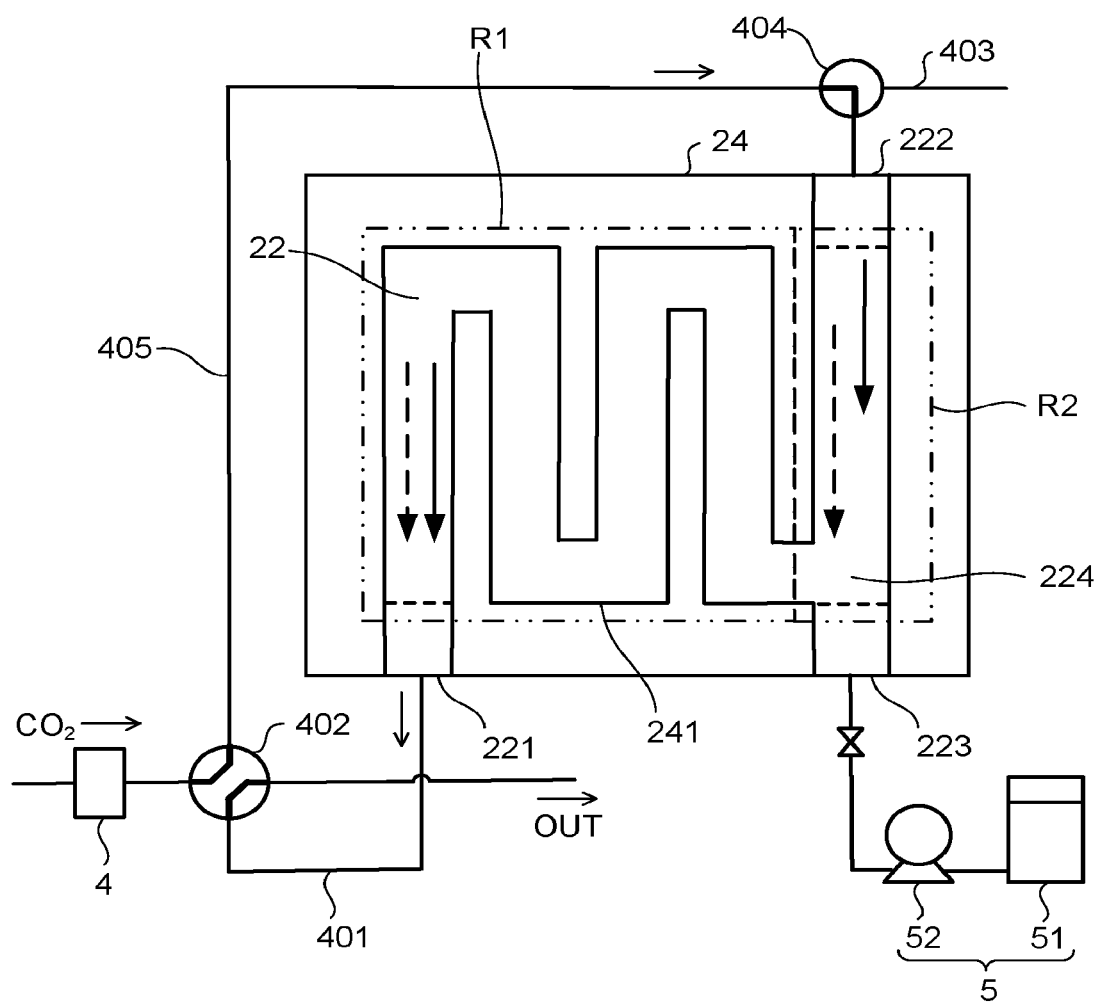
FIG. 5 is a plan view illustrating a configuration of the $CO_2$ gas flow path during a rinse operation of the cathode part illustrated in FIG. 2.

The rinse operation step S105 is performed in a manner as follows, for example. The rinse operation step S105 may be performed after stopping the output of the power supply P, but it is preferable to perform the rinse operation while continuing the output of the power supply P. First, as illustrated in FIG. 5, the multiport valve 402 is operated to connect the gas supply unit 4 to the third pipe 405. At the same time, the multiport valve 404 is operated to connect the third pipe 405 to the second opening 222. By connecting the third pipe 405 to the second opening 222 via the multiport valve 404, the rinse material which has flowed through the auxiliary flow path 224 from the third opening 223 toward the second opening 222, is not discharged from the second opening 222 but flows back from the second opening 222 toward the first opening 221 due to the $CO_2$ gas which flows in from the second opening 222.

As described above, by switching the connection of the multiport valve 402 and the multiport valve 404 to reverse the flow of the $CO_2$ gas from the second opening 222 toward the first opening 221, it is possible to reverse the flow of the rinse material which has flowed through the auxiliary flow path 224 from the third opening 223 toward the second opening 222. The rinse material flowed back through the auxiliary flow path 224 further flows to the first opening 221.

A mechanism of reversing the flow of the $CO_2$ gas functions as a mechanism of reversing the flow of the rinse material. In the electrolysis operation, the rinse material that has flowed between the third opening 223 and the second opening 222 functions as a rinse material at an amount required at the time of the rinse operation, and dissolves salt precipitated in the $CO_2$ gas flow path 22. The rinse operation may be performed while supplying the rinse material from the third opening 223, but if a required amount of the rinse material can be flowed through the auxiliary flow path 224, the rinse operation is preferably performed by stopping the supply of the rinse material from the third opening 223. This makes it possible to suppress flooding of the rinse material to the cathode 21, which is caused by using the rinse material at a required amount or more.

It is preferable to continuously apply a potential to the electrolysis cell 2 while the above-described rinse step is performed. This is, as one aspect, a refresh operation for the catalyst and is performed for the purpose of treating the ions and impurities adhering to the catalyst. When an oxidation treatment is mainly performed, ions and impurities such as organic matters adhering to the surface of the catalyst can be oxidatively treated and removed. Further, performance of this operation in the rinse material is effective because it is possible to perform not only the refresh of the catalyst but also the removal of ions substituted with an ion-exchange resin in the ion exchange membrane as the separator 30. A cyclic operation of repeating oxidation and reduction for the operation of the potential is preferable because the reproduction of the ion-exchange resin and the reproduction of the catalyst are accelerated. Further, depending on the circumstances, it is possible to apply the same potential as that in the normal operation to the electrolysis cell 2, to thereby perform refresh of the ion-exchange resin and the catalyst. It is not essential to apply the potential. This case offers the advantage that the system and the apparatus are simplified.

When the rinse solution is made to flow through the anode part 10 and the cathode part 20, a saturation degree of water in the gas diffusion layer increases, and output reduction occurs due to the diffusion of gas. Therefore, gas is supplied to the $CO_2$ gas flow path 22 and the anode solution flow path 12 to lower the saturation degree of water, whereby the output is restored and the refresh effect is increased. The gas flow operation for refresh is preferably performed right after the flow of the rinse solution, and is preferably performed within at least five minutes. This is because the output reduction due to the increase in the saturation degree of water is large, and if it is assumed that the refresh is performed at intervals of, for example, an hour, the output during the refresh operation in five minutes is zero or significantly small, so that ⁵⁄₆₀ of the output is lost. From such a viewpoint, it is preferable to make gas flow for a time as short as possible. When the above refresh operation is finished, the $CO_2$ electrolysis operation is restarted.

The supply and flow of the rinse material are performed for the purpose of preventing precipitation of an electrolyte contained in the anode solution and washing of the cathode 21, the anode 11, and the respective flow paths 12, 22. For this reason, as the rinse material, water is preferable, water having an electric conductivity of 1 mS/m or less is more preferable, and water having an electric conductivity of 0.1 mS/m or less is furthermore preferable. It is also possible that after making the rinse material flow back in the above-described step, the gas flow step is performed. The gas flow step can be performed by making the $CO_2$ gas keep flowing back, following the rinse step of making the rinse material flow back. As the gas used for the gas flow step, it is also possible to use air, oxygen, nitrogen, argon, or the like, instead of the $CO_2$ gas. However, in that case, a gas supply mechanism is required separately from the $CO_2$ gas supply unit 4, which increases a device cost and the like, so that it is preferable to adopt the reverse flow of the $CO_2$ gas.

The precipitation of salt in the cathode part 20 is likely to occur on an upstream portion side of the $CO_2$ gas flow path 22. This is because the humidity of the flow path is low at the upstream portion of the flow path and the precipitation of salt is likely to occur. Further, because the gas in the flow path is humidified at the downstream portion of the flow path by the water from the anode 11 and the water generated by the reaction, the precipitation amount of salt tends to be small. It is conceivable that liquid water is generated depending on the circumstances and possibly dissolves and discharges the salt. Further, one of the conceivable reasons why the precipitation amount of salt is small is that the $CO_2$ amount in gas is reduced at the downstream portion of the flow path because the $CO_2$ gas reacts at the upstream portion.

In the $CO_2$ gas flow path 22 exhibiting the above state, if the rinse material is supplied from the first opening 221 to the second opening 222 illustrated in FIG. 2, the salt dissolution and removal effect cannot be sufficiently obtained at the downstream portion of the flow path and only flooding of the cathode 21 by the rinse material is caused. Accordingly, as illustrated in FIG. 5, by making the rinse material flow from the second opening 222 toward the first opening 221 of the $CO_2$ gas flow path 22, it is possible to efficiently dissolve the salt. Specifically, the precipitation amount of salt is small on the second opening 222 side, so that in a state where a concentration of the salt component in the introduced rinse material such as the rinse solution is suppressed, it is possible to send the solution to the first opening 221 side to cause elution of the salt, resulting in that the elution of salt can be caused efficiently by a small amount of the rinse material. Therefore, by mixing the $CO_2$ gas and the rinse material and making the mixture flow through the $CO_2$ gas flow path 22, the rinse operation can be performed while the reaction is continued.

In FIG. 4 and FIG. 5, the auxiliary flow path 224 of the $CO_2$ gas flow path 22 is preferably provided to a region which is not in contact with the cathode 21, of the $CO_2$ gas flow path 22. Specifically, a first region R1 in FIG. 4 and FIG. 5 indicates a region where the cathode 21 exists. A second region R2 indicates a region where the cathode 21 does not exist. Therefore, during when the $CO_2$ gas flows through the $CO_2$ gas flow path 22 that exists in the first region R1, the reduction reaction of $CO_2$ occurs. On the other hand, during when the $CO_2$ gas flows through the auxiliary flow path 224 of the $CO_2$ gas flow path 22 that exists in the second region R2, the reduction reaction of $CO_2$ does not occur. By providing the auxiliary flow path 224 to such a second region R2, it is possible to prevent the precipitation of salt in the auxiliary flow path 224, and the flow of the rinse material is not blocked. Therefore, since a fixed amount of the rinse material can be flowed all the time, it is possible to prepare the rinse material at an amount required for the rinse step in the auxiliary flow path 224.

The rinse material used for the rinse step is not limited to the rinse solution such as water, but it may also be the discharge solution from the cathode part 20, the electrolytic solution as the anode solution, the cooling water, or the like, as described above. Each of FIG. 4 and FIG. 5 illustrates a configuration of a case where the rinse solution such as water is used as the rinse material. A configuration of a case where the discharge solution from the cathode part 20 is used as the rinse material, will be explained while referring to FIG. 6. In the cathode part 20 illustrated in FIG. 6, a multiport valve 406 is connected to the second opening 222. Here, as the multiport valve 406, a 2-position 4-port valve is used. The multiport valve 402 is connected to the multiport valve 406 via the third pipe 405, similarly to FIG. 4 and FIG. 5. The multiport valve 406 is connected to a discharge solution tank 53 that stores a cathode discharge solution via a fourth pipe 407 during the electrolysis operation. The discharge solution tank 53 has a gas/liquid separation function, and a reaction product such as CO discharged together with the cathode discharge solution is separated in the discharge solution tank 53. The multiport valve 406 is further connected to the multiport valve 402 via a fifth pipe 408.

Figure 6:
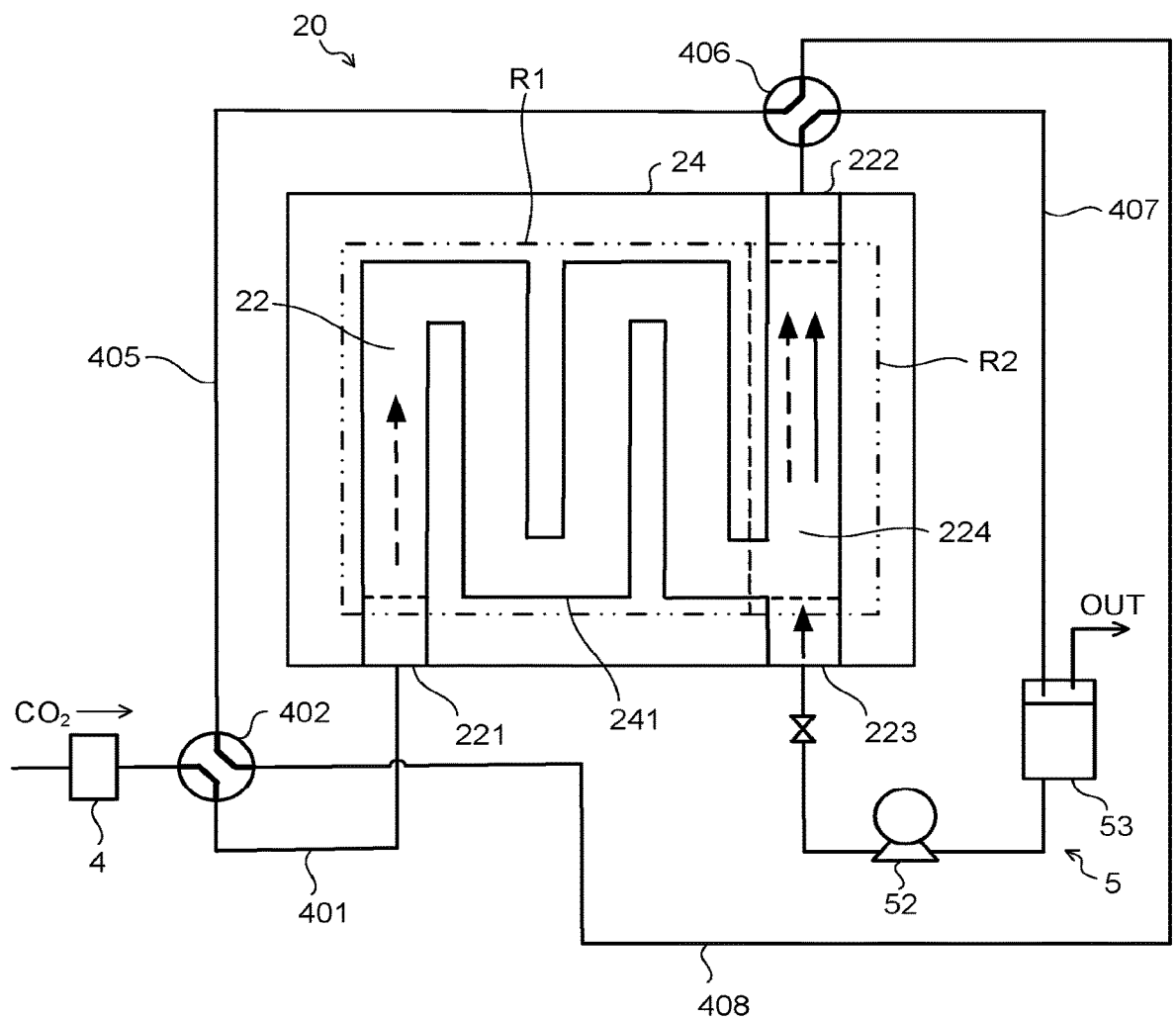
FIG. 6 is a plan view illustrating a second example of the $CO_2$ gas flow path of the cathode in the electrolysis cell of the arrangement illustrated in FIG. 1.

In the electrolysis operation of the cathode part 20 illustrated in FIG. 6, the multiport valve 402 is connected to the first pipe 401, to thereby make the $CO_2$ gas flow through the $CO_2$ gas flow path 22 via the first opening 221. The second opening 222 is connected to the fourth pipe 407 by the multiport valve 406. The $CO_2$ gas is reduced during a period of time in which it flows from the first opening 221 to the second opening 222, and the product gas such as CO, the cathode discharge solution, and the like are discharged from the second opening 222. The cathode discharge solution discharged from the second opening 222 is stored in the discharge solution tank 53. The cathode discharge solution includes water generated in the cathode 21, and the like. The cathode discharge solution stored in the discharge solution tank 53 is supplied to the auxiliary flow path 224 as the rinse material, via the pump 52 and the third opening 223. In the electrolysis operation, the cathode discharge solution circulates via the auxiliary flow path 224, the fourth pipe 407, and the discharge solution tank 53.

In the rinse operation of the cathode part 20 illustrated in FIG. 6, the multiport valve 402 is operated to connect the gas supply unit 4 to the third pipe 405. At the same time, the multiport valve 406 is operated to connect the third pipe 405 to the second opening 222. By connecting the third pipe 405 to the second opening 222 via the multiport valve 406, the cathode discharge solution as the rinse material which has flowed through the auxiliary flow path 224 from the third opening 223 toward the second opening 222, is not sent from the second opening 222 to the discharge solution tank 53 but flows back from the second opening 222 toward the first opening 221 due to the $CO_2$ gas which flows in from the second opening 222. By switching the connection of the multiport valve 402 and the multiport valve 406 to reverse the flow of the $CO_2$ gas from the second opening 222 toward the first opening 221, it is possible to reverse the flow of the cathode discharge solution which has flowed through the auxiliary flow path 224 from the third opening 223 toward the second opening 222.

The cathode discharge solution as the rinse material flowed back through the auxiliary flow path 224 further flows to the first opening 221. The cathode discharge solution is discharged from the first opening 221, and is further sent to the discharge solution tank 53 via the first pipe 401, the multiport valve 402, the fifth pipe 408, the multiport valve 406, and the fourth pipe 407. In the electrolysis operation, the cathode discharge solution that has flowed between the third opening 223 and the second opening 222 functions as a rinse material at an amount required at the time of the rinse operation, and dissolves salt precipitated in the $CO_2$ gas flow path 22. The rinse operation may be performed while supplying the cathode discharge solution from the third opening 223, but if the cathode discharge solution can be flowed through the auxiliary flow path 224 as a required amount of the rinse material, the rinse operation is preferably performed by stopping the supply of the rinse material from the third opening 223. This makes it possible to suppress flooding of the rinse material to the cathode 21, which is caused by using the rinse material (cathode discharge solution) at a required amount or more.

Figure 7:
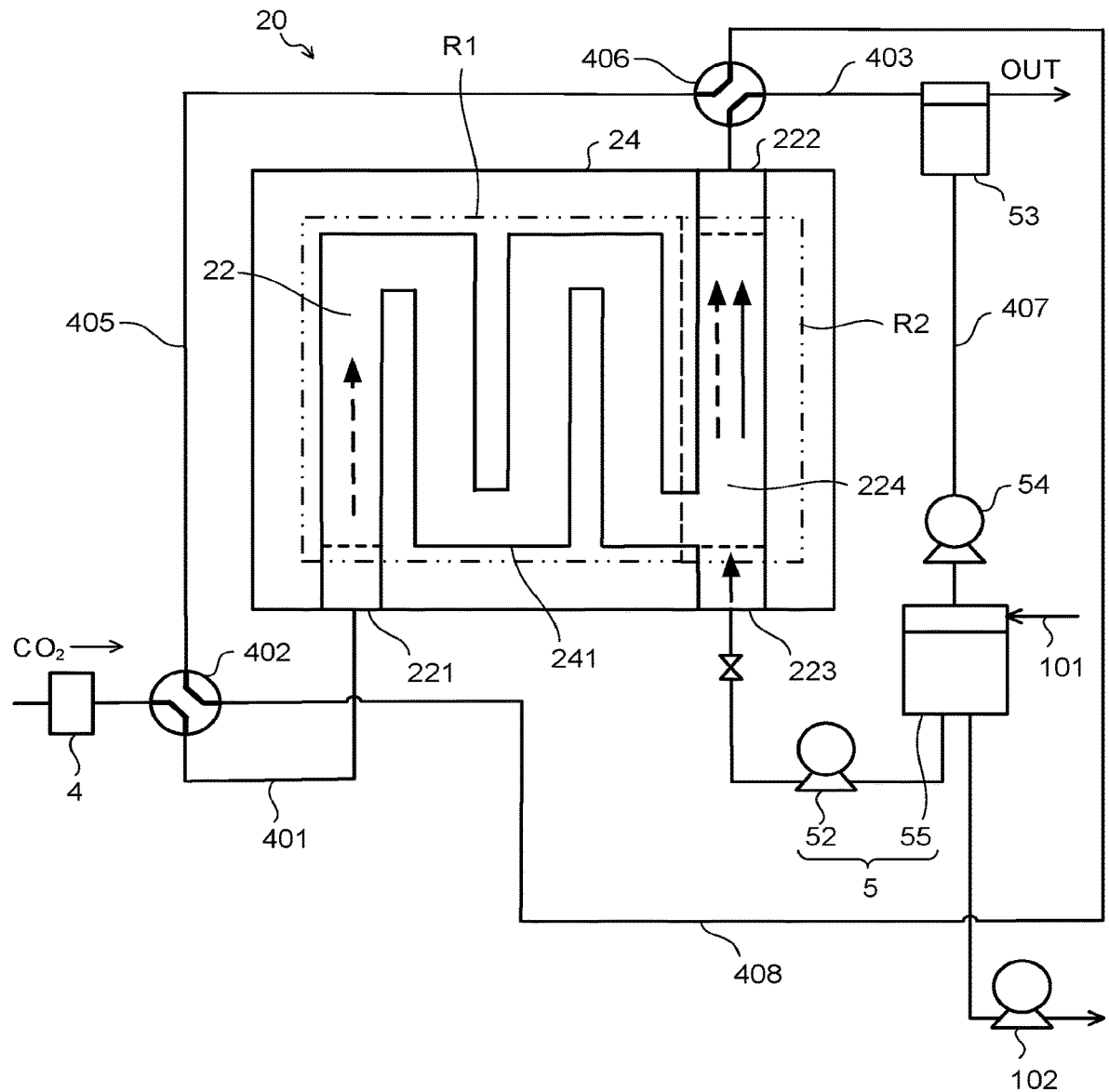
FIG. 7 is a plan view illustrating a third example of the $CO_2$ gas flow path of the cathode in the electrolysis cell of the arrangement illustrated in FIG. 1.

Next, a configuration of a case where the electrolytic solution as the anode solution is used as the rinse material, will be described while referring to FIG. 7. The cathode part 20 illustrated in FIG. 7 is different from the cathode part 20 illustrated in FIG. 6 in points below. Specifically, the multiport valve 406 is connected to the second opening 222, the second pipe 403, the third pipe 405, and the fifth pipe 408. The second pipe 403 is provided with the discharge solution tank 53 having a gas/liquid separation function, and a reaction product such as CO is separated in the discharge solution tank 53. The cathode discharge solution is sent to an anode solution tank 55 via the fourth pipe 407 and a pump 54. To the anode solution tank 55, a pipe 101 from the anode part 10 is connected. The anode solution tank 55 is connected to the third opening 223 via the pump 52. In the electrolysis operation, the anode solution circulates, as the rinse material, via the auxiliary flow path 224, the multiport valve 406, the discharge solution tank 53, the fourth pipe 407, the anode solution tank 55, and the pump 52.

Also in the cathode part 20 illustrated in FIG. 7, the anode solution is supplied to the auxiliary flow path 224 as the rinse material via the anode solution tank 55, the pump 52, and the third opening 223. In the rinse operation of the cathode part 20 illustrated in FIG. 7, the anode solution as the rinse material that has flowed through the auxiliary flow path 224 from the third opening 223 toward the second opening 222, is not sent from the second opening 222 to the discharge solution tank 53 but flows back from the second opening 222 toward the first opening 221 due to the $CO_2$ gas which flows in from the second opening 222. By reversing the flow of the anode solution in the auxiliary flow path 224, it is possible to dissolve salt precipitated in the $CO_2$ gas flow path 22 to refresh the $CO_2$ gas flow path 22.

Further, since the precipitation of salt occurs when a component of the electrolytic solution as the anode solution and $CO_2$ react, a concentration of the component of the electrolytic solution in the cathode discharge solution is gradually increased. For this reason, when the operation is performed for a long period of time, a performance of causing elution of salt is reduced. Accordingly, by using the anode solution as the rinse material, the concentration of the component of the electrolytic solution in the anode solution can be balanced, which makes it possible to perform the operation for a long period of time. At this time, by connecting the discharge solution tank 53 to the anode solution tank 55, it becomes easy to maintain the concentration of the component of the electrolytic solution in the anode solution. The anode solution in the anode solution tank 55 is returned to the anode part 10 by a pump 102 according to need. It is also possible that the discharge solution tank 53 is used in common with the anode solution tank 55, to thereby keep the balance of the concentration of the component of the electrolytic solution. A similar effect is obtained also when the circulated cathode discharge solution is sent to the anode part 10 side in the cathode part 20 illustrated in FIG. 6.

Figure 8:
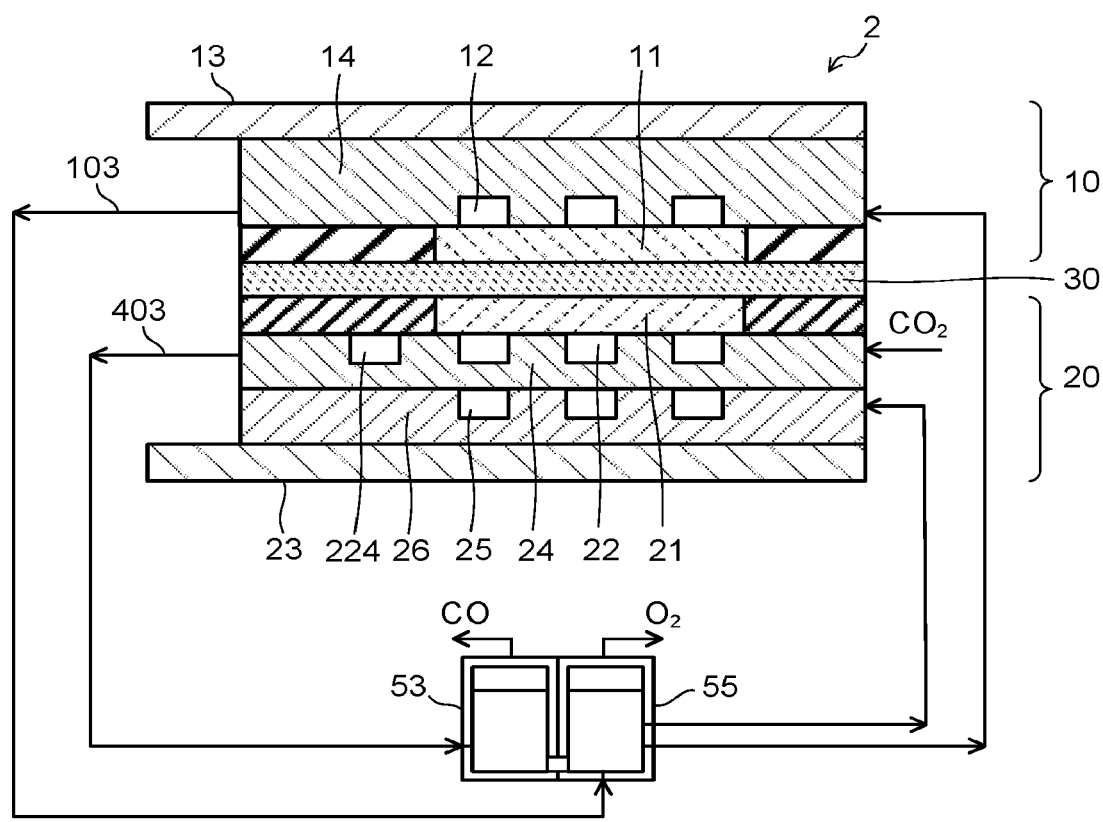
FIG. 8 is a sectional view illustrating a modified example of the $CO_2$ gas flow path of the cathode and a cooling water flow path in the electrolysis cell of the arrangement illustrated in FIG. 1.

As the rinse material, a cooling liquid may also be used. The higher the current density, the more the precipitation of salt is likely to occur, and under an operating condition with high current density, the cell voltage increases and the electrolysis efficiency decreases. In such a case, it is preferable to perform cooling of the electrolysis cell 2. For example, when, in order to provide a cooling water flow path 25 separately from the $CO_2$ gas flow path 22, a third flow path plate 26 having the cooling water flow path 25 is disposed by being stacked with respect to the second flow path plate 24, as illustrated in FIG. 8, the cooling water flow path 25 is connected to the auxiliary flow path 224 of the $CO_2$ gas flow path 22. By adopting such a configuration, it is possible to make the cooling water flow through the auxiliary flow path 224 in the electrolysis operation, and besides, it is possible to make the cooling water flow back through the $CO_2$ gas flow path 22 as the rinse material to dissolve salt in the rinse operation.

In FIG. 8, the cathode discharge solution and the anode solution are used as the cooling water to be flowed through the cooling water flow path 25. Accordingly, a discharge pipe 403 for discharging the cathode discharge solution is connected to the discharge solution tank 53, and a discharge pipe 103 for discharging the anode solution is connected to the anode solution tank 55. The discharge solution tank 53 and the anode solution tank 55 are connected, and the cathode discharge solution and the anode solution are sent, in a mixed state, to the cooling water flow path 25 and the anode solution flow path 12 in the electrolysis operation. The rinse operation is performed similarly to that in the cathode part 20 illustrated in FIG. 7. By adopting such a configuration, it is possible to realize the dissolution of salt in the $CO_2$ gas flow path 22, the cooling of the electrolysis cell 2, and the prevention of reduction in the component of the electrolytic solution in the anode solution. Note that the cooling water to be flowed through the cooling water flow path 25 may also be simple water, and in that case, it is only required to configure that water (cooling water) circulates through the cooling water flow path 25. Besides, even if the cooling water flow path 25 is not provided and the rinse solution, the cathode discharge solution, and the anode solution are only made to flow through the auxiliary flow path 224, it is possible to obtain a partial cooling effect of the electrolysis cell 2.

Figure 9:
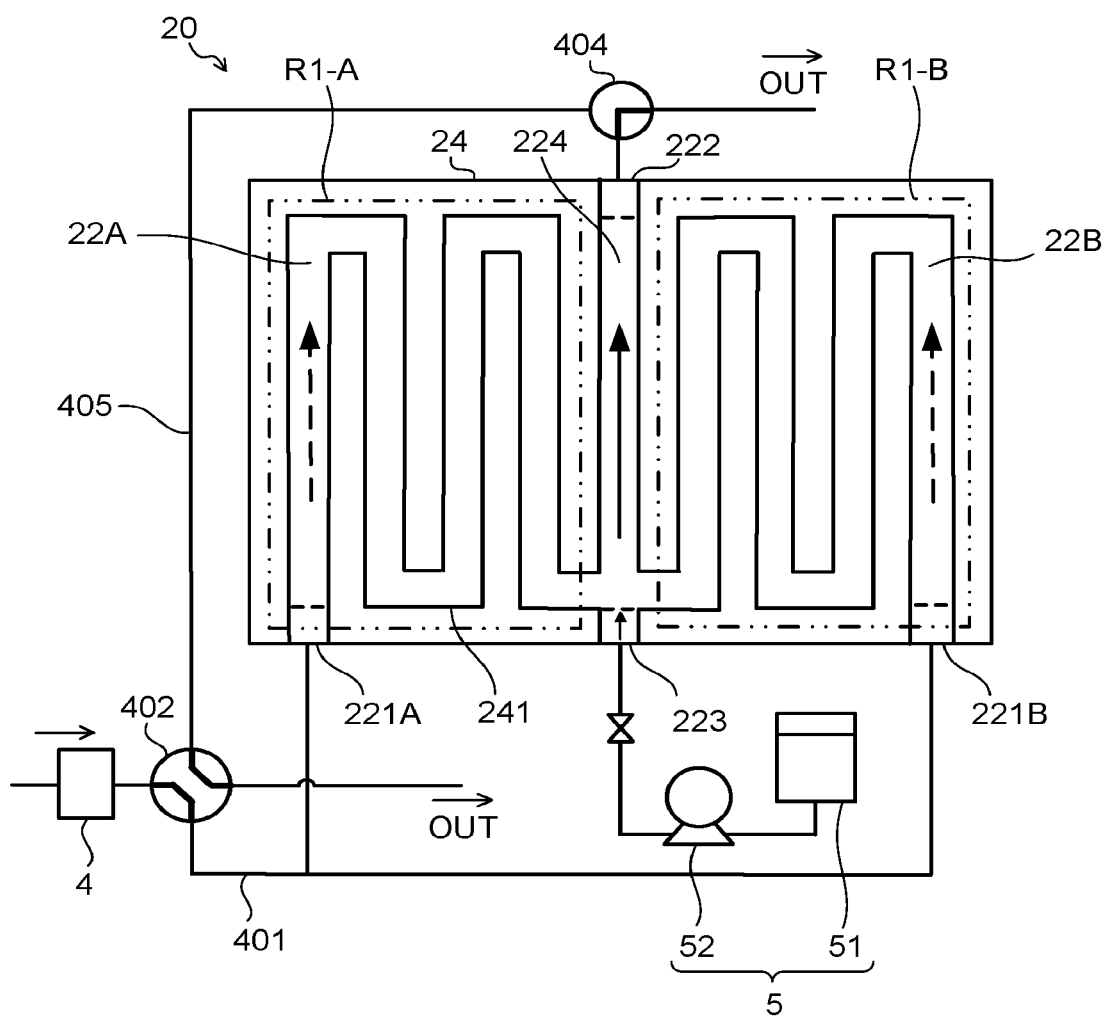
FIG. 9 is a plan view illustrating a first modified example of the cathode in the electrolysis cell of the arrangement illustrated in FIG. 1.

The configuration of the electrolysis cell 2 and the configuration of the auxiliary flow path 224 are not limited to the configurations as illustrated in FIG. 2. The number of the auxiliary flow path is not limited to one with respect to a reaction flow path and a reaction catalyst surface of the electrolysis cell. For example, as illustrated in FIG. 9, when one flow path plate 24 has two catalyst surfaces, a $CO_2$ gas flow path 22A is provided by being corresponded to a first catalyst surface (a first region R1-A), and a $CO_2$ gas flow path 22B is provided by being corresponded to a second catalyst surface (a first region R1-B). First openings 221 in the $CO_2$ gas flow path 22A and the $CO_2$ gas flow path 22B are individually provided. The $CO_2$ gas flow path 22A has a first opening 221A, and the $CO_2$ gas flow path 22B has a first opening 221B. The $CO_2$ gas flow path 22A and the $CO_2$ gas flow path 22B are connected to a common second opening 222. Besides, the $CO_2$ gas flow path 22A and the $CO_2$ gas flow path 22B have a common auxiliary flow path 224. To the auxiliary flow path 224, the third opening 223 which supplies the rinse material is connected.

In the electrolysis cell 2 as described above, the $CO_2$ gas flows through the inside of the $CO_2$ gas flow path 22A from the first opening 221A toward the auxiliary flow path 224, and the $CO_2$ gas flows through the inside of the $CO_2$ gas flow path 22B from the first opening 221B toward the auxiliary flow path 224. The $CO_2$ gas flows through the inside of the $CO_2$ gas flow path 22A and the $CO_2$ gas flow path 22B, and a reaction product such as CO produced by reducing $CO_2$ in the first region R1-A and the first region R1-B, and the cathode discharge solution are discharged from the common second opening 222 via the common auxiliary flow path 224. When performing the rinse step, similarly to FIG. 5, by making the $CO_2$ gas flow back from the second opening 222, the rinse solution in the auxiliary flow path 224 is made to flow back toward each of the $CO_2$ gas flow path 22A and the $CO_2$ gas flow path 22B.

Figure 10:
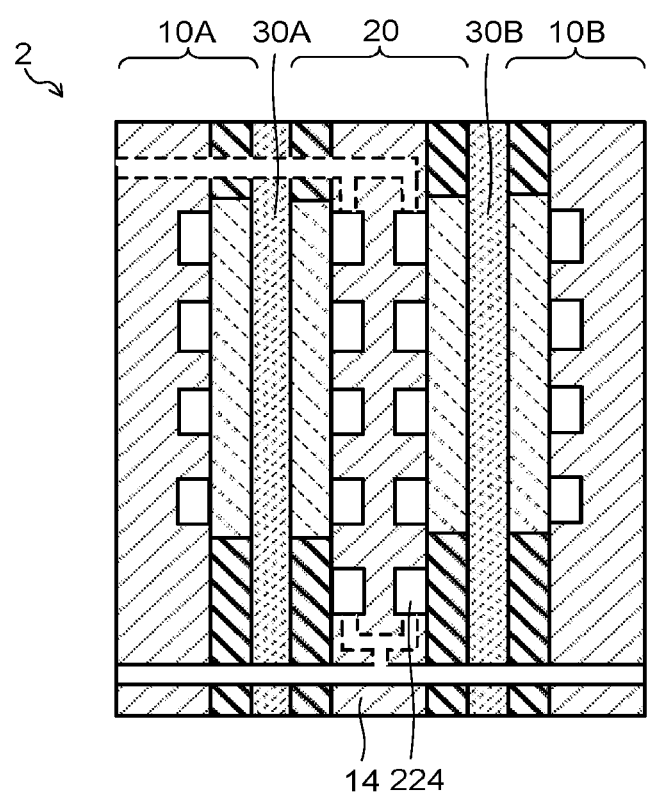
FIG. 10 is a sectional view illustrating a second modified example of the cathode in the electrolysis cell of the arrangement illustrated in FIG. 1.

The configuration as above is preferable because, although it is difficult to supply an equal amount of the rinse solution to the two reaction catalyst surfaces, the total volume of the electrolysis cell 2 can be reduced when considering an outer peripheral area and a volume of the auxiliary flow path 224. In FIG. 9, the two reaction catalyst surfaces are provided on a single surface, but the configuration is not limited to this. For example, it is also possible to design such that, as illustrated in FIG. 10, the $CO_2$ gas flow path 22 is provided on both surfaces of the first flow path plate 14, and the auxiliary flow path 224 is provided on a side surface or inside thereof. By designing as above, it is possible to reduce the volume of the electrolysis cell 2 per reaction amount.

In the case of the electrolysis cell 2 having a stack structure as illustrated in FIG. 10, the precipitation of salt is not uniform due to a temperature distribution and a pressure distribution. When salt is precipitated, it is difficult to make a solution flow to each cell at an equal flow rate since a pressure loss in each cell is different. In the case of the rinse material, in particular, the pressure loss becomes large in a cell in which salt is precipitated, and a large amount of gas flows to a cell in which a precipitation amount of salt is small. The same applies to the rinse material, and when the rinse material is simply supplied from the outside to the stacked cells, a large mount of the rinse material flows to a cell in which a precipitation amount of salt is small. Under such circumstances, the rinse effect, namely, the elution effect of salt becomes different depending on plural cells. Regarding such a point, by previously providing the auxiliary flow path 224 in the electrolysis cell 2, and making the rinse material in the auxiliary flow path 224 flow through the $CO_2$ gas flow path 22 when salt is precipitated, as in the electrolysis cell 2 of the embodiment, it is possible to make the rinse material at a flow rate suitable for dissolving precipitated salt flow through all of the stacked electrolysis cells 2. When the precipitation amount of salt is uniform in each of the electrolysis cells 2, it is possible to make an equal amount of the rinse material flow to all of the electrolysis cells 2.

Further, when an electrolysis cell in which a precipitation amount of salt is different due to a different temperature, such as an electrolysis cell that exists at the end, is stacked, a length of the auxiliary flow path is previously increased in a cell in which a precipitation amount of salt is large, for example, to thereby facilitate the elution of salt in each electrolysis cell, resulting in that a uniform reaction can be performed in each electrolysis cell. Even when the rinse solution is poured from a manifold of stacked electrolysis cells, the rinse solution does not evenly flow to each electrolysis cell. Accordingly, by providing the auxiliary flow path to each electrolysis cell to secure a supply unit of the rinse material, it is possible to increase the efficiency and the operating life of the entire stack. Further, by providing the auxiliary flow paths to the inside of the stacked electrolysis cells, it is possible to supply an equal amount of the rinse material or the rinse material suitable for each electrolysis cell without providing a valve and so on to each electrolysis cell, so that the volume of the entire stack can be reduced and the system can be simplified.

Figure 11:
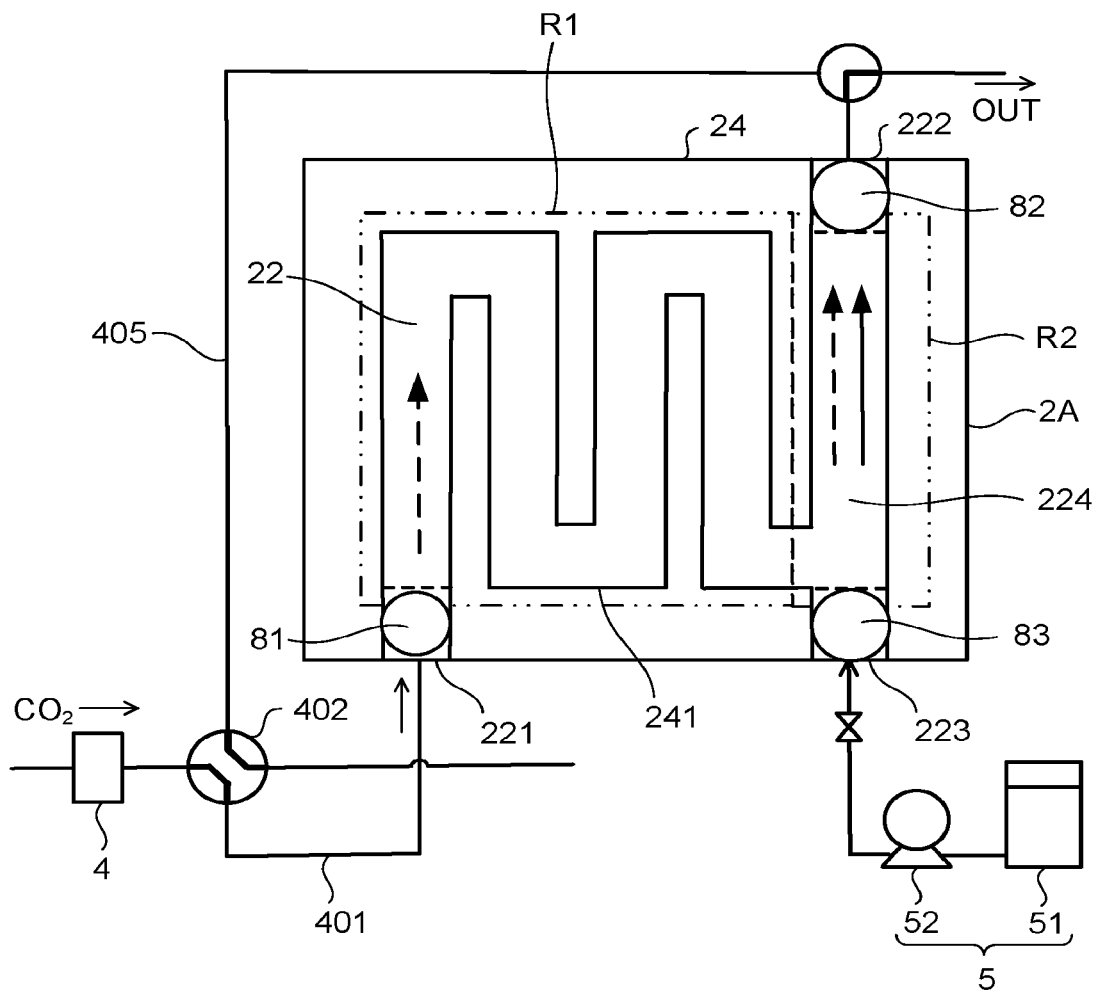
FIG. 11 is a plan view illustrating a $CO_2$ gas flow path of a cathode which applies stack-type electrolysis cells.
Figure 12:
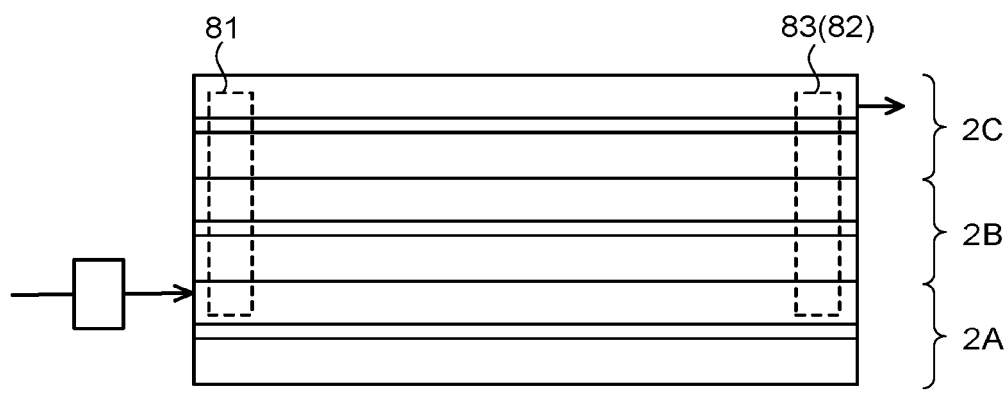
FIG. 12 is a side view of the stack-type electrolysis cells illustrated in FIG. 11.

Each of FIG. 11 and FIG. 12 illustrates a configuration of a case where plural electrolysis cells 2 (2A, 2B, 2C) are stacked. Each of the electrolysis cells 2A, 2B, 2C has a configuration as illustrated in FIG. 11. Specifically, the $CO_2$ gas flow path 22 of each of the electrolysis cells 2A, 2B, 2C is provided with the auxiliary flow path 224. The first openings 221, the second openings 222, and the third openings 223 in the $CO_2$ gas flow paths 22 of the electrolysis cells 2A, 2B, 2C are connected by manifolds 81, 82, 83, respectively, inside the cells. By adopting such a configuration, it is possible to make the rinse material at a flow rate suitable for dissolving precipitated salt flow through each of the stacked electrolysis cells 2A, 2B, 2C. The manifolds 81, 82, 83 may be those which connect the respective flow paths and the respective openings outside the electrolysis cells 2A, 2B, 2C.

Note that the relation between the auxiliary flow path and an outlet of the $CO_2$ gas flow path may be different, and it is also possible that the auxiliary flow path is connected to the outlet of $CO_2$ at the time of normal reaction, and only water is made to flow through the auxiliary flow path. It is possible that, when performing the refresh, $CO_2$ and water are introduced from the inlet side of the auxiliary flow path at the time of normal reaction, gas and water are made to flow toward the $CO_2$ gas inlet at the time of normal reaction, and are discharged finally. At this time, the refresh may be performed while keeping water flowing, or only water accumulated in the auxiliary flow path may be supplied when performing the refresh. When only water is made to flow through the auxiliary flow path at the time of normal reaction, a gas-liquid two-layer flow in the flow path does not occur, and a pressure loss of gas in the reaction flow path becomes uniform in each cell, resulting in that a flow distribution becomes equal, or controllability is improved because gas is made to flow exactly as designed. Further, since only water is made to flow through the auxiliary flow path, a fixed amount of water required for the refresh can be made to flow accurately. The connection of water pipe in the middle of the inlet and the outlet of the $CO_2$ gas flow path at the time of normal reaction is not preferable since it is difficult to control an amount of water in the auxiliary flow path due to an influence of a pressure loss of a gas flow rate and the like, and further, a length of the auxiliary flow path is increased, which leads to an increase in a size of cell and a size of stack.

EXAMPLES

Next, examples and evaluation results thereof will be described.

Example 1

The carbon dioxide electrolysis cell and the carbon dioxide electrolytic device illustrated in FIG. 1 and FIG. 2 were assembled, and the electrolysis performance of carbon dioxide was examined. For the electrolysis cell, a cathode was used in which carbon particles carrying gold nanoparticles were applied on carbon paper having a porous layer. The cathode was fabricated by the following procedure. First, a coating solution was produced by mixing the carbon particles carrying the gold nanoparticles, pure water, a Nafion solution, and ethylene glycol. An average particle diameter of the gold nanoparticles was 8.7 nm, and a carried amount thereof was 18.9 mass %. The coating solution was filled in an air brush, and subjected to spray coating onto the carbon paper provided with the porous layer by using a nitrogen gas. After the coating, the carbon paper was washed with flowing pure water for 30 minutes, and thereafter immersed in a hydrogen peroxide solution, whereby the organic matter such as ethylene glycol was oxidized and removed. This was cut into a size of 2×2 cm to be used as the cathode. Note that a coating amount of Au was estimated as about 0.2 mg/cm$^2$ based on a mixing amount of the gold nanoparticles and the carbon particles in the coating solution.

For the anode, an electrode in which $IrO_2$ nanoparticles to be a catalyst were applied to Ti mesh was used. As the anode, one made by cutting $IrO_2$/Ti mesh into 2×2 cm was used.

As illustrated in FIG. 1, the electrolysis cell 2 was produced in a manner that the cathode current collector 23, the $CO_2$ gas flow path 22 (third flow path plate 24), the cathode 21, the separator 30, the anode 11, the anode solution flow path 12 (first flow path plate 14), and the anode current collector 13 were stacked in this order from the top, and the stack was sandwiched between not-illustrated support plates and tightened by the bolts. For the separator 30, an anion exchange membrane (product name: Selemion, manufactured by ASAHI GLASS CO., LTD.) was used. The $IrO_2$/Ti mesh of the anode 11 was brought into close contact with the anion exchange membrane. Note that an evaluation temperature was set to room temperature.

The electrolytic device 1 was assembled by connecting the gas supply system and the electrolytic solution supply system to the above-described electrolysis cell 2, and the electrolytic device was operated under the following condition. $CO_2$ gas was supplied to the $CO_2$ gas flow path of the electrolysis cell at 20 sccm, and an aqueous potassium hydroxide solution (concentration of 1 M KOH) was introduced into the anode solution flow path at a flow rate of 20 mL/min. Next, by using the power supply, a constant current of 600 mA (constant current density of 150 mA/cm$^2$) was made to flow between the anode and the cathode to cause an electrolytic reaction of $CO_2$, and a cell voltage at that time was measured and collected as cell data. Further, part of gas output from the $CO_2$ gas flow path was collected, and production amounts of CO gas produced by a reduction reaction of $CO_2$ and $H_2$ gas produced by a reduction reaction of water were analyzed by a gas chromatograph. In the control unit, based on the gas production amounts, a partial current density of CO or $H_2$ and Faradaic efficiency being a ratio between the entire current density and the partial current density were calculated and collected. As the request criteria of the cell outputs of the refresh operation, a CO Faradaic efficiency was set to 50% or less, and the cell voltage when making the constant current flow was set to equal to or more than 3 V corresponding to 120% or more of the initial value of 2.5 V.

After 55 minutes from the start of the operation, a value of the CO Faradaic efficiency of 24% being 50% or less was detected, and therefore the refresh operation was carried out. The $CO_2$ gas was made to flow back to make water as the rinse solution flow back from the auxiliary flow path of the electrolysis cell, to thereby wash the $CO_2$ gas flow path. The flow of the rinse solution in the $CO_2$ gas flow path was performed by making the rinse solution in the auxiliary flow path flow back as described above. In such a rinse step, the output from the power supply was continued. The flow of the $CO_2$ gas was returned to its original state, to thereby restart the $CO_2$ electrolytic reaction. Regarding the cell outputs after the rinse, the CO Faradaic efficiency became 84%, with which it was confirmed that the cell outputs were restored by the rinse operation.

Example 2

The carbon dioxide electrolysis cell and the carbon dioxide electrolytic device illustrated in FIG. 1 and FIG. 2 were assembled, and the electrolysis performance of carbon dioxide was examined. The anode and the cathode catalyst were produced as in Example 1. Next, the electrolysis cell was assembled as in Example 1. For the separator, a PTFE porous body (product name; POREFLON) subjected to a hydrophilic treatment was used. Note that an evaluation temperature was room temperature.

The solution system and the gas system were connected to the above-described electrolysis cell, and the operation was carried out under the following condition. $CO_2$ gas was made to flow through the $CO_2$ gas flow path at a flow rate of 60 sccm, and an aqueous potassium hydroxide solution (concentration of 1 M KOH) was made to flow through the anode solution flow path at a flow rate of 2 mL/min. Next, by using the power supply, a current at 2.2 V was made to flow between the anode and the cathode to cause an electrolytic reaction of $CO_2$. The cell voltage at that time was collected. The produced gas was analyzed by a gas chromatograph analyzer as in Example 1.

After 31 minutes from the start of the operation, the refresh operation was carried out. The refresh operation was carried out as in Example 1 while keeping the voltage of the cell as it was, and then the operation was carried out by increasing the $CO_2$ gas flow rate to 200 ccm. The time taken for increasing the gas flow rate was about 30 seconds. The CO Faradaic efficiency was restored, with which it was confirmed that the cell outputs were restored by the refresh operation.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A carbon dioxide electrolytic device, comprising:
   a first electrolysis cell including a cathode to reduce carbon dioxide to produce a carbon compound, an anode to oxidize water to produce oxygen, a gas supply flow path to supply carbon dioxide to the cathode, a solution supply flow path to supply an electrolytic solution containing water to the anode, and a separator to separate the anode from the cathode;
   a carbon dioxide supply unit to supply the carbon dioxide to the gas supply flow path;
   an electrolytic solution supply unit to supply the electrolytic solution to the solution supply flow path; and
   a rinse material supply unit to supply a rinse material to the gas supply flow path, wherein:
   the gas supply flow path has a first opening provided on one end side, a second opening provided on the other end side, and an auxiliary flow path provided to a part of a flow path between the first opening and the second opening, and configured to make at least the rinse material flow therethrough; and
   a switching mechanism configured to switch a flow direction of the rinse material in the auxiliary flow path is connected to the gas supply flow path, wherein the gas supply flow path has a first region which is in contact with a part of the cathode in which a reduction catalyst exists, and a second region which is in contact with a part of the cathode in which no reduction catalyst exists; and at least a part of the auxiliary flow path is disposed in the second region.

2. The device according to claim 1, wherein:

the gas supply flow path further has a third opening provided between the first opening and the second opening;

the auxiliary flow path is provided between the third opening and the second opening; and the switching mechanism is configured to switch the flow direction of the rinse material between a first direction from the third opening to the second opening and a second direction from the second opening to the first opening.

3. The device according to claim 2, wherein the switching mechanism is configured to switch a first state in which the rinse material is made to flow in the first direction and a second state in which the rinse material is made to flow in the second direction so as to rinse the gas supply flow path with the rinse material.

4. The device according to claim 2, wherein:

the carbon dioxide supply unit has a first pipe connected to the first opening, a second pipe connected to the second opening, and a third pipe connected to the first opening and the second opening; and the switching mechanism is configured to switch a first state in which the carbon dioxide supply unit and the first pipe are connected and a second state in which the carbon dioxide supply unit and the third pipe are connected.

5. The device according to claim 4, wherein the switching mechanism has a multiport valve connected to the carbon dioxide supply unit, the first pipe, and the third pipe.

6. The device according to claim 1, wherein the rinse material supply unit includes a solution tank to store at least one rinse solution selected from water, a discharge solution from the cathode, and the electrolytic solution as the rinse material, and a solution supply mechanism to supply the rinse solution from the solution tank to the auxiliary flow path.

7. The device according to claim 1, further comprising a second electrolysis cell including a cathode to reduce carbon dioxide to produce a carbon compound, an anode to oxidize water to produce oxygen, a gas supply flow path to supply carbon dioxide to the cathode, a solution supply flow path to supply an electrolytic solution containing water to the anode, and a separator configured to separate the anode from the cathode, and stacked or disposed in a parallel manner with respect to the first electrolysis cell, wherein:

the second electrolysis cell is connected to the carbon dioxide supply unit, the electrolytic solution supply unit, and the rinse material supply unit;

the gas supply flow path of the second electrolysis cell has a first opening provided on one end side, a second opening provided on the other end side, and an auxiliary flow path provided to a part of a flow path between the first opening and the second opening, and configured to make at least the rinse material flow therethrough; and a switching mechanism configured to switch a flow direction of the rinse material in the auxiliary flow path of the second electrolysis cell is connected to the gas supply flow path.

8. The device according to claim 7, wherein the first opening and the second opening of the gas supply flow path of the second electrolysis cell are respectively connected to the first opening and the second opening of the gas supply flow path of the first electrolysis cell.

9. A method of electrolyzing carbon dioxide, comprising:

a first step of supplying carbon dioxide from a carbon dioxide supply unit to a gas supply flow path of a first electrolysis cell, and supplying an electrolytic solution from an electrolytic solution supply unit to a solution supply flow path of the first electrolysis cell, the first electrolysis cell including a cathode, an anode, the gas supply flow path to supply carbon dioxide to the cathode, the solution supply flow path to supply the electrolytic solution to the anode, and a separator configured to separate the anode from the cathode;

a second step of making a rinse material flow through an auxiliary flow path provided to a part of a flow path between a first opening and a second opening of the gas supply flow path, simultaneously with the supply of the carbon dioxide;

a third step of applying a voltage from a power supply connected to the anode and the cathode, reducing carbon dioxide in a vicinity of the cathode of the first electrolysis cell to produce a carbon compound, and oxidizing water in a vicinity of the anode to produce oxygen; and a fourth step of switching a flow direction of the rinse material in the auxiliary flow path to rinse an inside of the gas supply flow path with the rinse material that exists in the auxiliary flow path, wherein the gas supply flow path has a first region which is in contact with a part of the cathode in which a reduction catalyst exists, and a second region which is in contact with a part of the cathode in which no reduction catalyst exists; and at least a part of the auxiliary flow path is disposed in the second region.

10. The method according to claim 9, wherein:

the auxiliary flow path is provided between a third opening which is provided between the first opening and the second opening of the gas supply flow path, and the second opening;

the carbon dioxide in the first step is made to flow from the first opening toward the second opening;

the rinse material in the second step is made to flow from the third opening toward the second opening, simultaneously with the flow of the carbon dioxide; and the rinse material in the fourth step is made to flow from the auxiliary flow path toward the first opening.

11. The method according to claim 10, wherein the carbon dioxide is made to flow from the second opening toward the first opening in the fourth step.

12. The method according to claim 11, wherein:

the carbon dioxide supply unit has a first pipe connected to the first opening, a second pipe connected to the second opening, and a third pipe connected to the first opening and the second opening;

the carbon dioxide in the first step is supplied to the first opening via the first pipe;

the carbon dioxide in the fourth step is supplied to the second opening via the third pipe; and the rinse material in the fourth step is made to flow from the second opening toward the first opening by the flow of the carbon dioxide.

13. The method according to claim 9, wherein
the rinse material includes at least one selected from water, a discharge solution from the cathode, and the electrolytic solution, and the rinse material in the second step is supplied simultaneously with the supply of the carbon dioxide in the first step.

14. The method according to claim 9, wherein:
the carbon dioxide, the electrolytic solution, and the rinse material are supplied to a second electrolysis cell which is stacked or disposed in a parallel manner with respect to the first electrolysis cell, simultaneously with the supply to the first electrolysis cell; and
the rinse with the rinse material in the fourth step is performed on the second electrolysis cell simultaneously with the performance on the first electrolysis cell.

\* \* \* \* \*